United States Patent [19]

Latchinian

[11] Patent Number: 5,345,737
[45] Date of Patent: Sep. 13, 1994

[54] SYSTEM OF MODULAR BUILDING ELEMENTS FOR DISPLAY FIXTURES

[76] Inventor: Jim S. Latchinian, 1594 NW. 159th St., Miami, Fla. 33169

[21] Appl. No.: 901,942

[22] Filed: Jun. 22, 1992

[51] Int. Cl.⁵ .......................... E04B 9/06; F16D 1/00
[52] U.S. Cl. ................... 52/280; 403/231; 403/378; 403/379; 403/172
[58] Field of Search ............... 403/231, 255, 378, 379, 403/362, 172, 217; 52/280

[56] References Cited

U.S. PATENT DOCUMENTS

| 2,371,493 | 3/1945 | Aschinger | 403/172 |
| 3,458,052 | 7/1969 | Kann | 403/255 |
| 3,672,710 | 6/1972 | Kroopp | 403/255 |
| 4,473,315 | 9/1984 | Latchinian | 403/172 |
| 5,011,323 | 4/1991 | Liuo | 403/172 |

FOREIGN PATENT DOCUMENTS

| 2812502 | 9/1979 | Fed. Rep. of Germany | 403/255 |
| 2231117 | 11/1990 | United Kingdom | 403/231 |

*Primary Examiner*—Carl D. Friedman
*Assistant Examiner*—Christopher Todd Kent
*Attorney, Agent, or Firm*—Oltman and Flynn

[57] ABSTRACT

A modular system of coordinated, interlocking building elements for display fixtures, which include a variety of extruded metal parts, assembled by means of various connectors that attach to the extrusions by means of set screws or snap-ins and provide a framework for holding glass panels, shelves, brackets, light fixtures and the like.

26 Claims, 25 Drawing Sheets

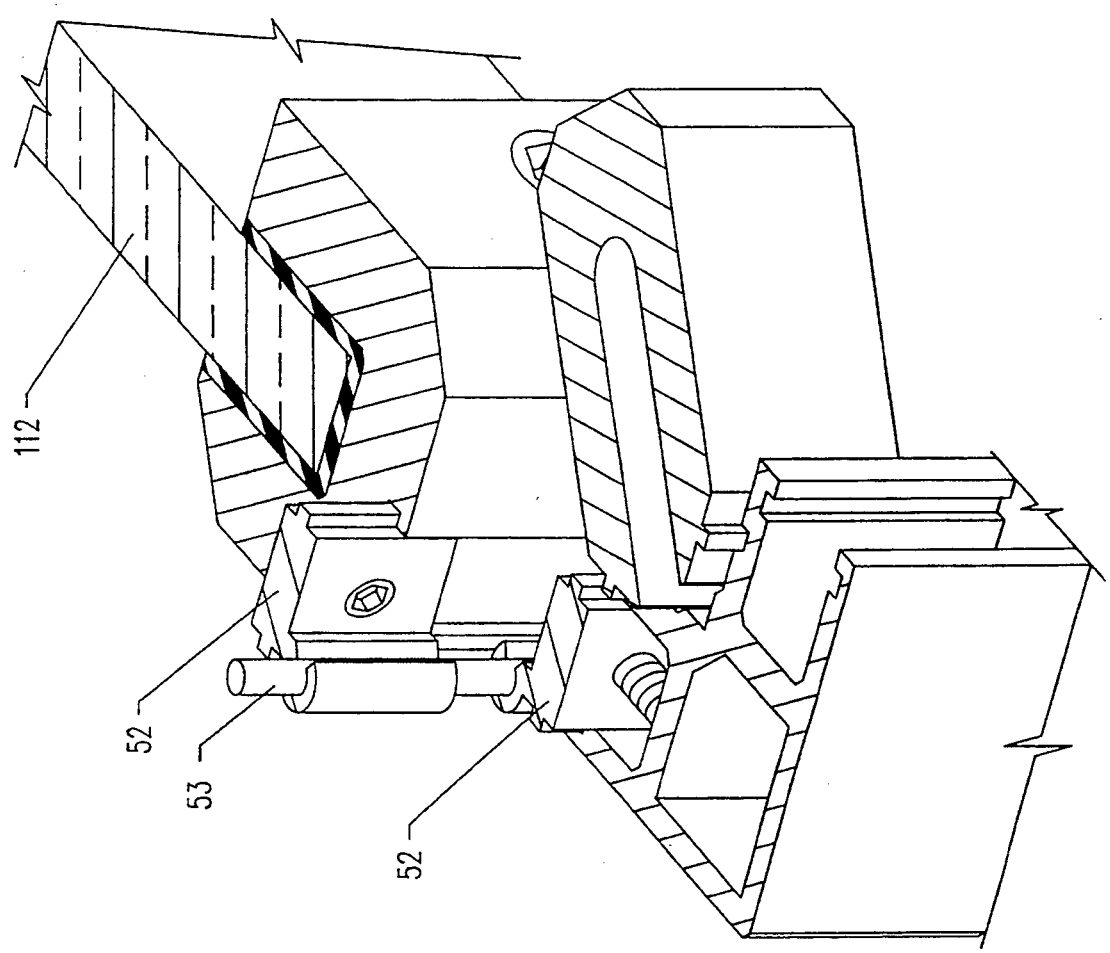

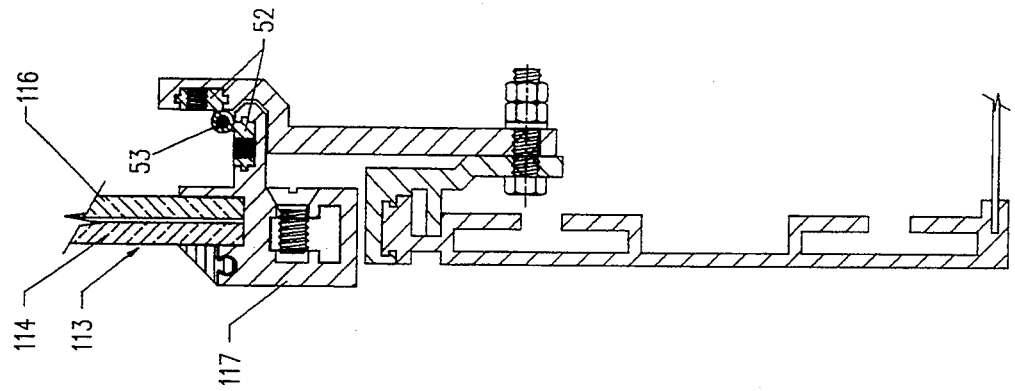
FIG.20i
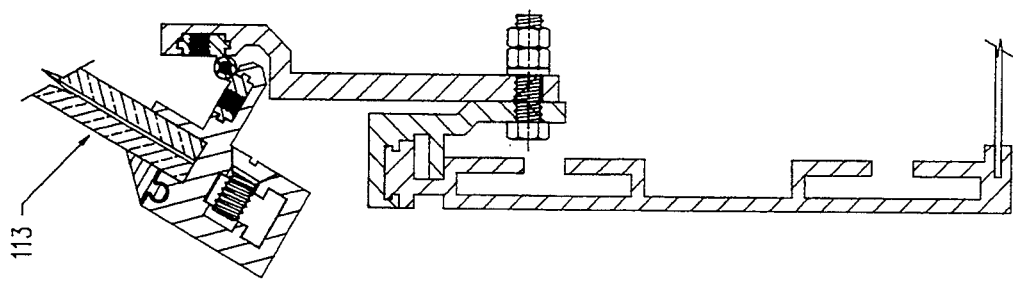
FIG.20j
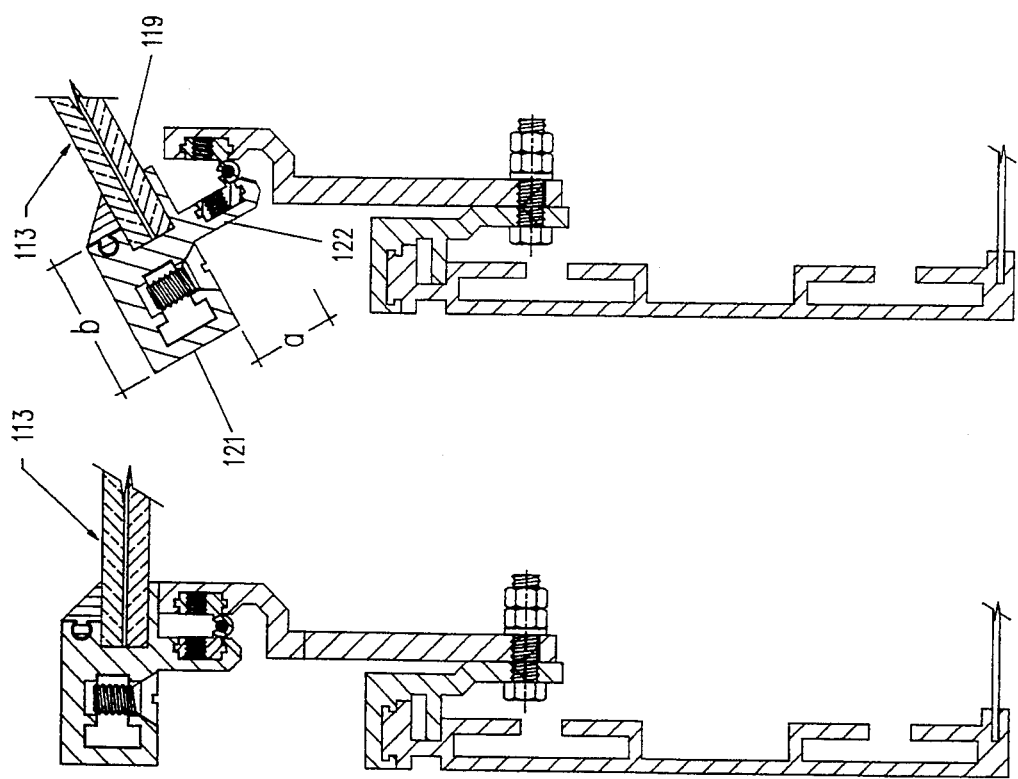
FIG.20k
FIG.20L

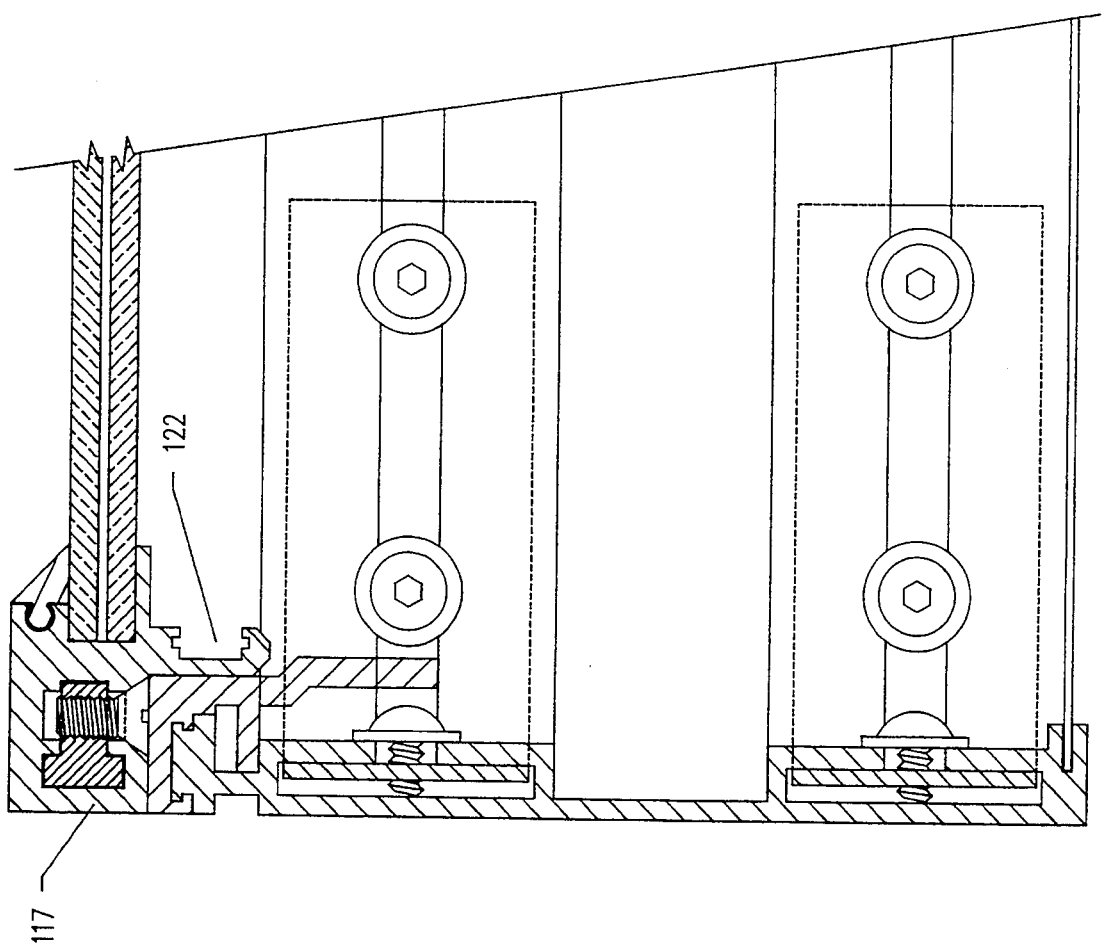

SYSTEM OF MODULAR BUILDING ELEMENTS FOR DISPLAY FIXTURES

The invention relates to a modular system of building elements for wall displays and counter displays and more particularly to a modular system including building elements made for interlocking metal extensions and connectors that provides a high degree of expandability, flexibility and ease of assembly.

BACKGROUND AND PRIOR ART

In construction of fixtures for displaying various types of merchandise it is very desirable to have a high degree of flexibility and expandability because in an environment of merchandising floor plans frequently change, expand and contract according to the changing needs of the particular design and configuration needs of the sites.

It is also necessary that such fixtures are robust in order to resist the wear and tear encountered in a public place and have an attractive appearance so as to present the displayed merchandise in an advantageous manner.

Modular display furniture is known from U.S. Pat. No. 4,334,796 which shows a furniture edge assembly based on extruded elements. U.S. Pat. No. 4,473,315 shows a further development of this concept and introduces additional interlocking elements based on extrusions and prefabricated connectors.

The instant invention is a further development of the systems disclosed in the aforesaid U.S. Patents and adds a further degree of modularity, versatility, variety and robustness, combined with ease of assembly and disassembly.

SUMMARY OF THE INVENTION

In accordance with the invention there is provided a modular system of coordinated, interlocking building elements for displays which include a variety of extruded metal parts, assembled by means of various connectors that attach to the extrusions by means or set screws and provide a framework for holding glass panels, shelves, brackets, light fixtures and the like.

There is accordingly provided connectors having at least two arms, each arm having an external cross-sectional profile, the arms having a common junction, each arm having at least one recess with an inward facing edge facing the junction. A plurality of extrusions each having a closed channel for receiving one of the arms of the connector, and threaded holes in the channels for receiving the set screws, wherein the holes are aligned with the inward facing edges so that a conical end surface of the set screws offsetly engages the inward facing edges for urging the extrusion in the direction of the junctions.

According to a further feature, the extrusions have mitre-cut inward facing ends for matching each other at the junction, and wherein the extrusion has at least one open channel facing away from the closed channel for receiving other ones of the building elements.

There is further provided a modular system according to the invention, wherein the open channel is formed by a pair of parallel longitudinal walls, each having at least one groove therein for receiving another building element, and wherein other building elements having longitudinal strips that are receivable in the grooves.

There may further be provided a modular system which includes a universal prismatic connector and at least two pairs of the longitudinal strips that are slidably receivable in matching grooves in mutually facing open channels of an adjacent parallel building element for joining the elements.

According to the invention there is also provided an extrusion having a single open channel having two outward facing strips receivable in respective grooves of a pair of parallel longitudinal walls of an adjoining element.

The modular building system according to the invention also includes an extrusion with at least one further open channel parallel with the single open channel for receiving a utility element, which can be a light fixture, or the like.

The modular building system according to the invention may further have the open channel formed by one pair of parallel longitudinal walls, each wall having a longitudinal groove facing the other wall of the pair for slidably receiving another one of the building elements having longitudinal strips each matching a respective longitudinal groove in each of the longitudinal walls.

The modular system can further include an extrusion with a plurality of open channels each of which has a pair of parallel longitudinal walls, wherein each wall has a longitudinal groove facing the other wall for receiving another one of the building elements which has longitudinal strips matching a respective longitudinal groove in each longitudinal wall.

In the modular system according to the invention one of the channels includes two right angle longitudinal walls disposed at 90° angle with each other forming a right angle channel, each wall having a longitudinal groove in adjoining sides of said right angle walls, and a shelf support having a prismatic body with a right angle edge matching the right angle channel. The right angle edge has longitudinal strips receivable in the longitudinal grooves in the right angle channel, and further has a threaded mounting hole perpendicular to the right angle edge through the prismatic body, with a mounting screw receivable in the mounting hole for securing the shelf support to the 90° channel.

In accordance with the invention, there is further provided a modular system which has a decorative insert strip receivable in the open channel, and wherein the insert strip has a longitudinal side flange extending away from the insert strip, and still further, the extrusion may have an open channel which includes a longitudinal door stop flange, and a spring-loaded ball door stop located in the open channel.

The modular system according to the invention may further include a longitudinal door hinge extension on the prismatic body of the universal connector wherein the door hinge extension has a longitudinal hole for receiving a hinge pin.

According to another feature, the modular system includes a T-connector which is slidably receivable in the open channel and extends perpendicularly thereto. The T-connector has an elongate prismatic body with two transverse strips at one end of the prismatic body, each matching a respective groove in the longitudinal walls; and has a threaded longitudinal hole in the prismatic body. A mounting screw is receivable in the threaded hole for mounting the prismatic body perpendicularly to the open channel. The prismatic body has at least one recess with an inward facing edge facing the open channel. A further extrusion has a closed channel for receiving the prismatic body; at least one threaded hole is formed in the further extrusion for receiving the set screw. The threaded hole is aligned with the inward facing edge so that the conical surface of the set screw is offsetly engaging the inward facing edge for urging the further extrusion in the direction toward the extrusion with the open channel.

The modular system according to the invention may include at least one sliding door bottom track and at least one sliding door top track for receiving sliding doors. A roller assembly is attached to a bottom edge of the door, and at least one rail is provided in the sliding door bottom track for slidably supporting the roller assembly.

Further still the modular system according to the invention may include at least one of the universal connectors for attaching the top track to a top extrusion, and at least one other of the universal connectors for attaching the bottom trace to a bottom extrusion, and it can additionally have an extruded partition column located between the top and bottom extrusion, and one of the universal connectors for attaching each end of the column extrusion to a respective top and bottom extrusion.

Further objects and advantages or this invention will be apparent from the following detailed description of a presently preferred embodiment which is illustrated schematically in the accompanying drawings.

BRIEF DESCRIPTION OF THE DRAWINGS

FIG. 21 is a cross-sectional detail view of the invention showing an end column for holding electric outlets and shelf brackets and the like;

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
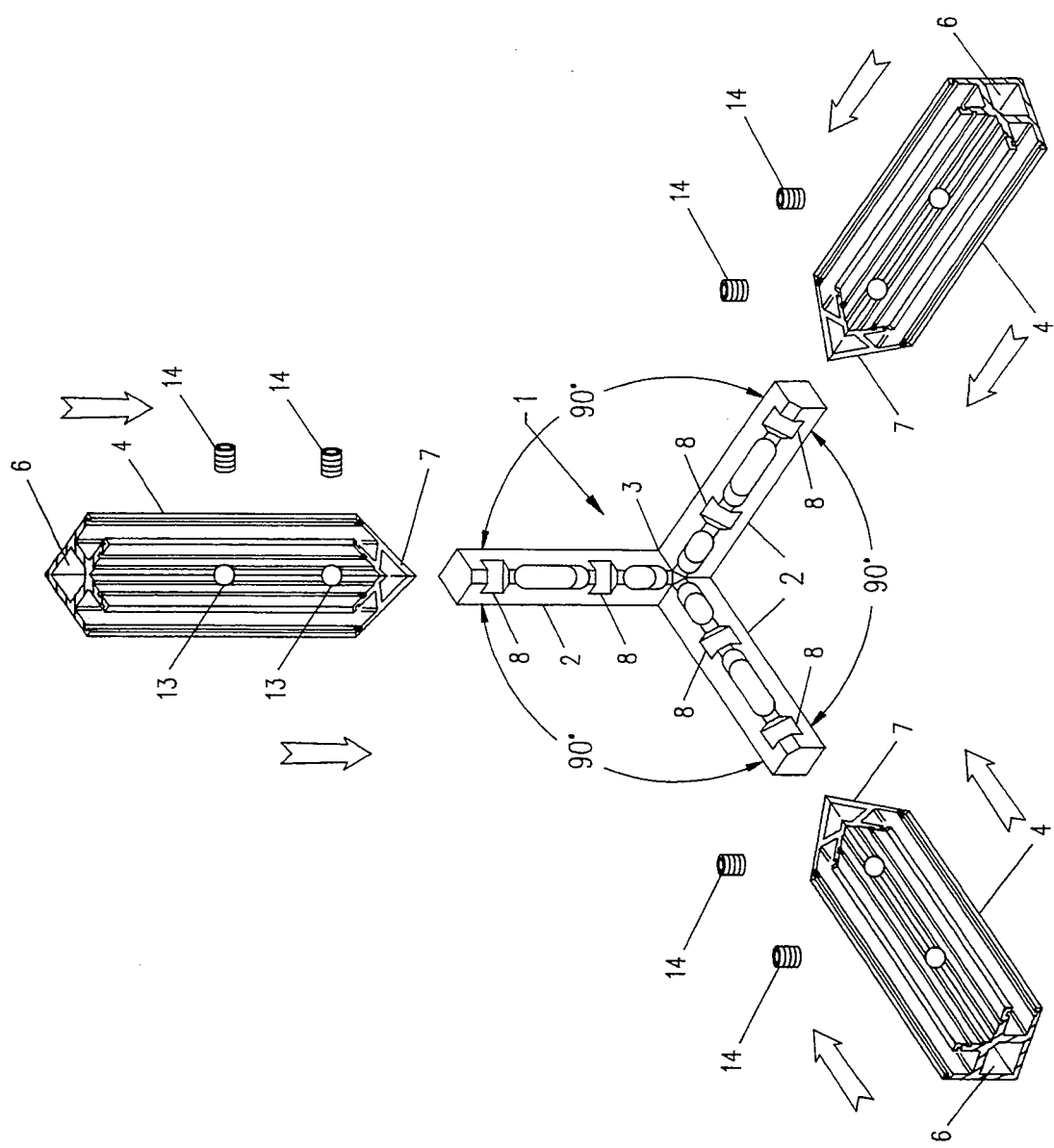
FIG. 1 is a perspective view showing an angle connector with three arms and mitrecut matching extrusions.

In FIG. 1 an angle connector 1 has three arms 2, coming together at a junction 3. The arms are arranged perpendicular at 90° angles to each other. Extrusions 4 all have a closed channel 6 with a profile matching the cross-sectional profile of the arms 2. The inner ends 7 of the extrusions are mitre-cut at angles so that the ends 7 come together in a virtually seamless junction.

Figure 2:
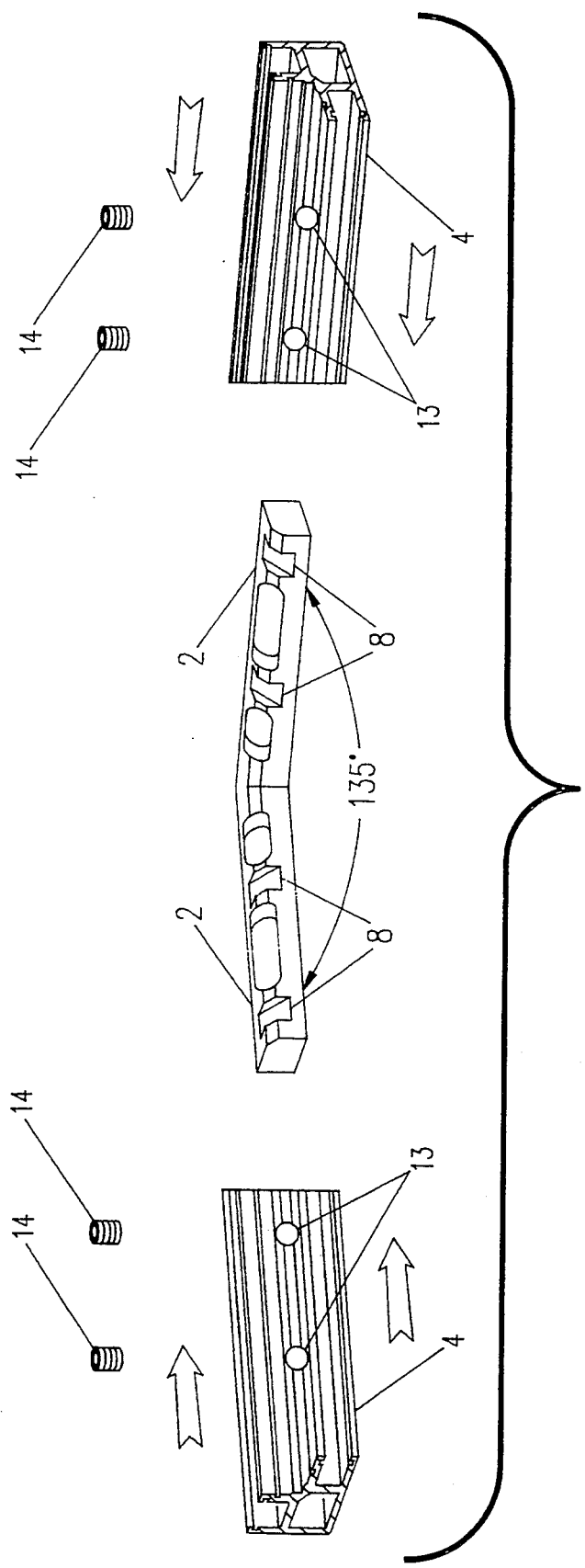
FIG. 2 is a perspective view showing a twoarm angle connector with matching mitrecut extrusions.
Figure 3:
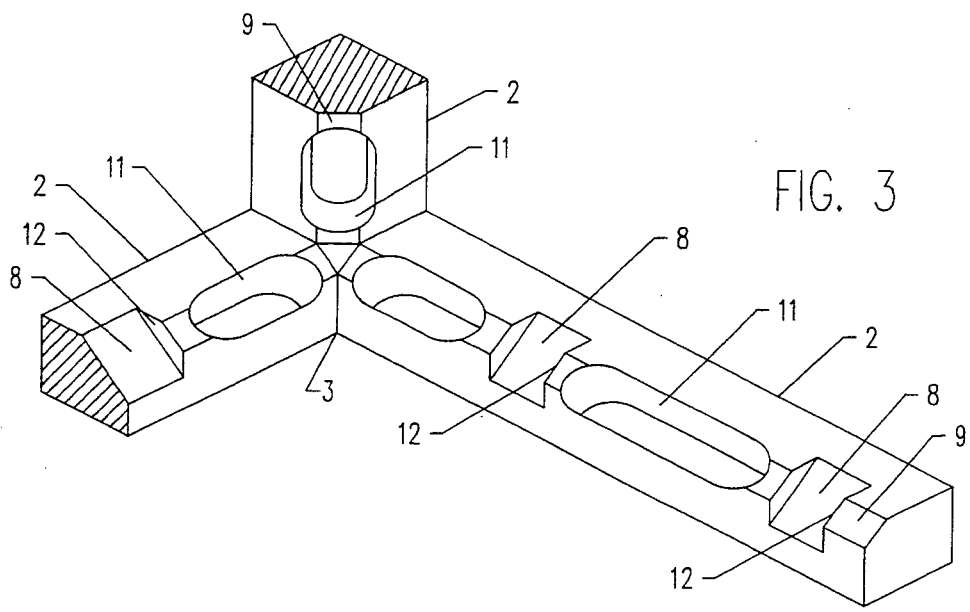
FIG. 3 is a fragmentary enlarged detail of the invention showing details of the threearm angle connector.
Figure 4:
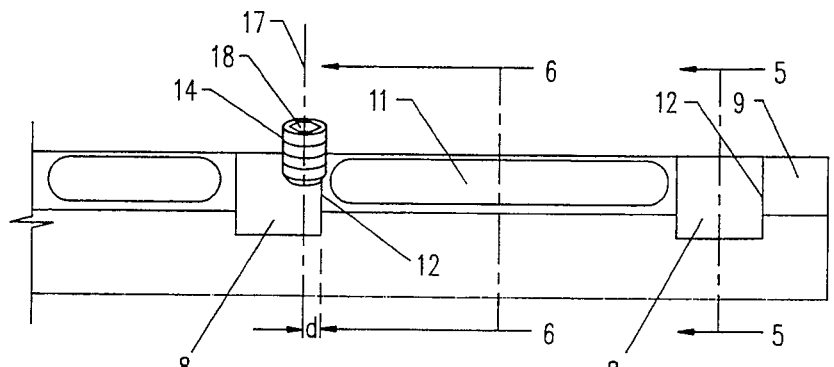
FIG. 4 is a fragmentary enlarged detail view showing part of the angle connector with an inward facing edge and an offset set screw.
Figure 5:
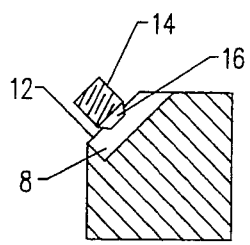
FIG. 5 is a cross-sectional view of the invention seen along the line 5—5 of FIG. 4 showing a cross-sectional profile of the angle connector.
Figure 6:
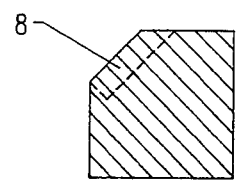
FIG. 6 is a cross-sectional view of the invention seen along line 6—6 of FIG. 4, showing another cross-sectional profile of the angle connector.
Figure 7:
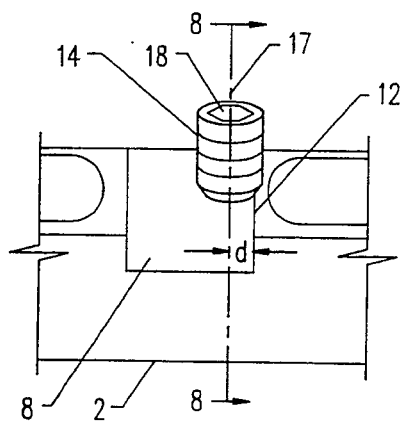
FIG. 7 is a fragmentary view of the invention showing a set screw in engagement with an inward facing edge.
Figure 8:
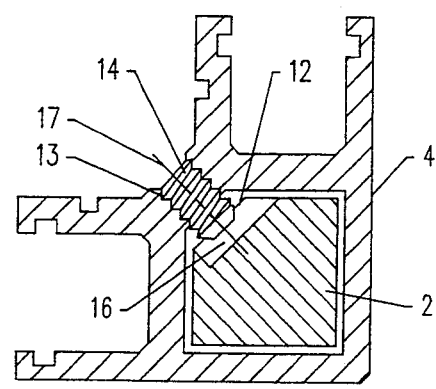
FIG. 8 is a cross-sectional fragmentary view of the invention seen along the line 8—8 of FIG. 7.

FIG. 2 shows another angle connector with only two arms 2 forming an odd angle, e.g. 135° as shown, with corresponding extrusions 4, again having their ends mitre-cut so as to form virtually seamless joints, Each of the arms has recesses 8 cut into a faceted edge 9, as shown enlarged in FIG. 3, 4, 5, 6, 7 and 8.

As seen in FIGS. 3–7, each arm 2 has a square cross-sectional profile with one corner forming the facet 9. Pockets 11 have also been formed in the arms 2 for the purpose of lightening the material and facilitating casting of the part. Each recess 8 has an inward facing edge 12 that faces inward toward the junction 3 of the arm 2. Each extrusion 4 has a number of, e.g. two, threaded holes 13 that serve to receive a set screw 14. Each set screw has a conical inner end 16, that may advantageously be a truncated cone. The threaded holes 13 are positioned so that the axis 17 of the set screw 14 is off-set a small distance d, best seen in FIGS. 4 and 7, so that when the screw 14 is tightened in the threaded hole 13, the conical surface 16 on the set screw 14 contacts the inward facing edge 12 with the result that as the screw 14 is tightened hard, the extrusion 4 is drawn firmly in inward direction toward the junction 3 of the arms. The set screw 14 advantageously has an Allen type hexagonal drive hole 18 in its outer end.

With several e.g. two, set screws in each extrusion, a considerable inwardly directed force is applied to each extrusion when the set screws are tightened firmly.

Figure 10:
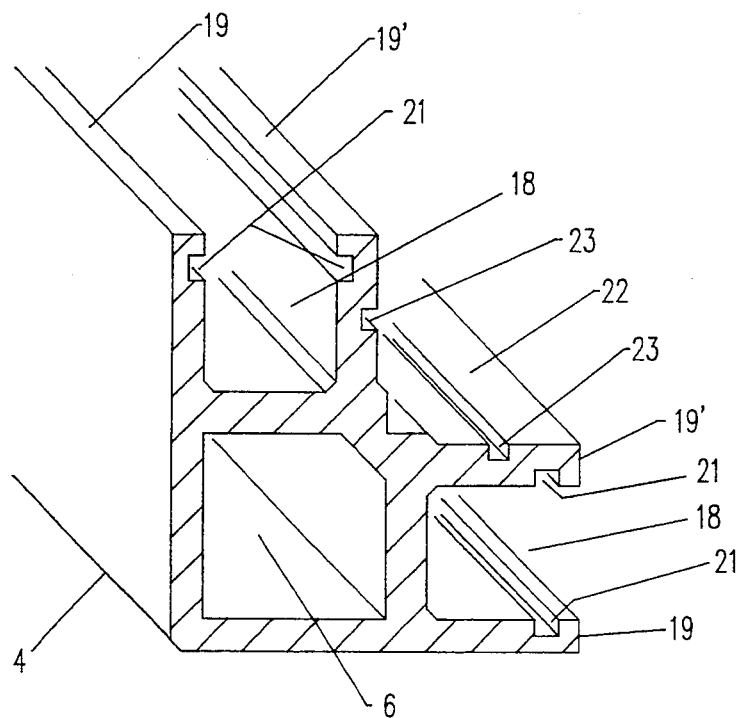
FIG. 10 is a perspective view showing an edge extrusion.

FIG. 10 shows the cross-section of the extrusion 4, and is one of the most versatile of the extrusions used in the disclosed system. It has the closed channel 6 and two identical longitudinal open channels 18, each with parallel side walls 19 and 19'. Each side wall 19 and 19' has an inward facing longitudinal groove 21 near the outer edge of the walls 19, 19'. A third right angle open channel 22 is formed by the two adjoining walls 19 and 19' that are angled ninety degrees apart. The right angle open channel 22 also has two longitudinal grooves 23 of the same dimensions as the aforesaid grooves 21 in the right angle channels 18, but are placed slightly more inward in the channel 22.

Figure 11:
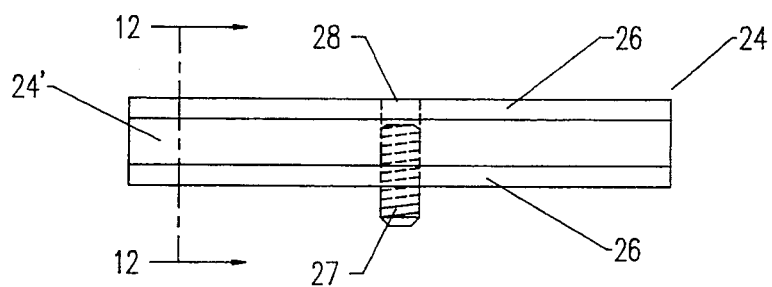
FIG. 11 is an elevational detail view of the invention showing a universal connector.
Figure 12:
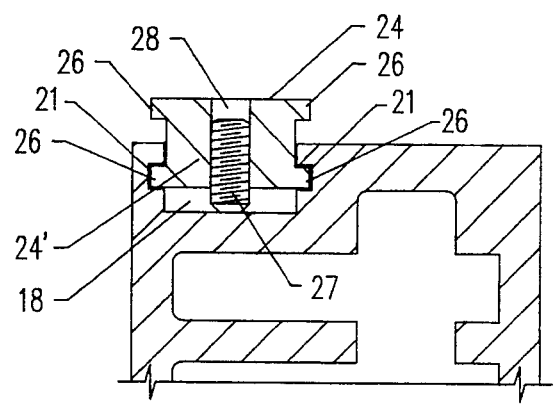
FIG. 12 is a cross-sectional detail view of the invention seen along the line 12—12 of FIG. 11 showing the universal connector inserted in an extrusion.
Figure 14A:
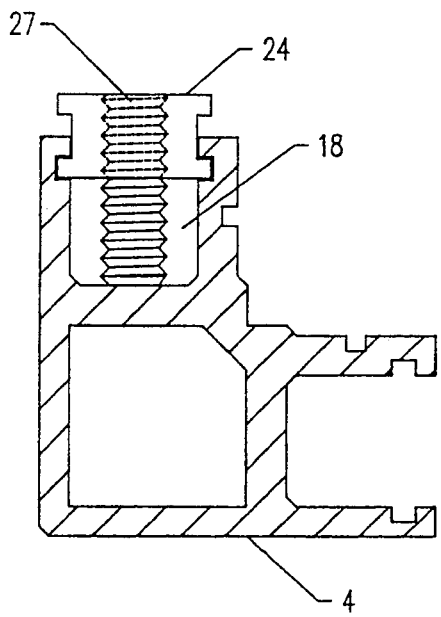
FIG. 14a, b & c are cross-sectional detail views showing various uses of an open right angle channel.

FIGS. 11 and 12 are two views of a universal connector 24, used to join parallel extruded elements, having open channels of the type 18 seen in FIG. 10. The universal connector 24 has an elongate prismatic body 24' with two pairs of strips 26 placed at opposite sides of the prismatic body 24', which fit in the grooves 21 of the open channel 18, as also seen in FIG. 14a, with one half part of the prismatic body 24' inside the channel 18. A set screw 27 inserted through a threaded hole 28 in the universal connector 24 serves to lock the connector in the channel 18 as seen in FIG. 12 and 14a.

Figure 13A:
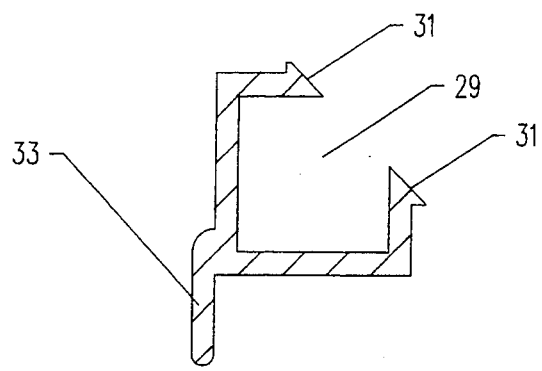
FIG. 13a, b and c are cross-sectional detail views of extrusions with only open channels for containing e.g. a light fixture.
Figure 13B:
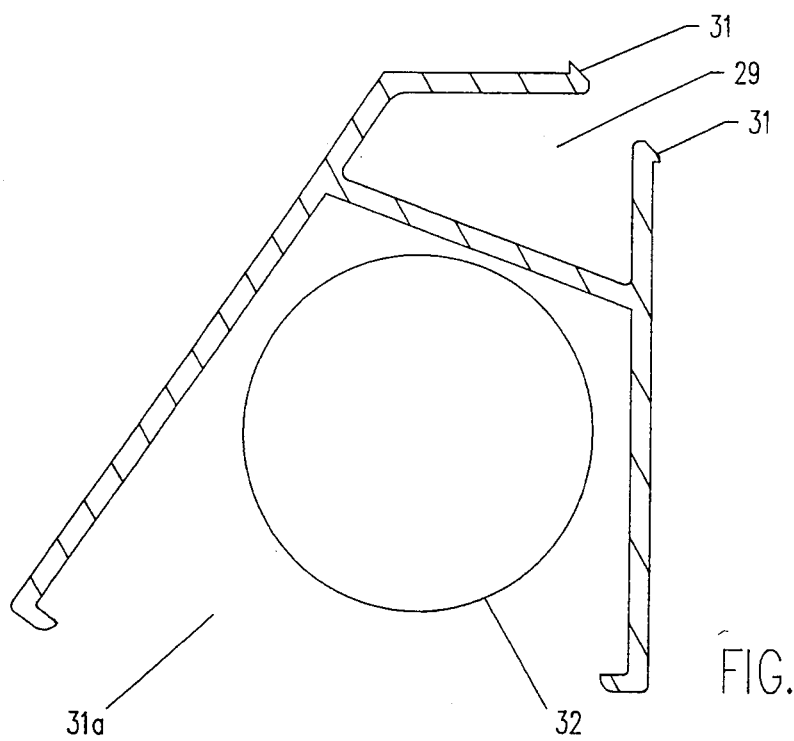
Figure 13C:
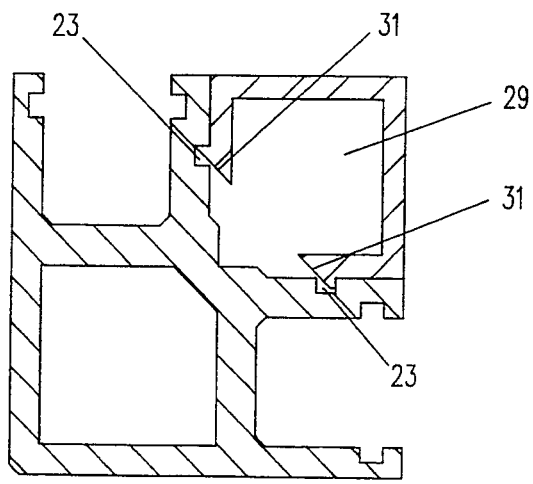
Figure 27:
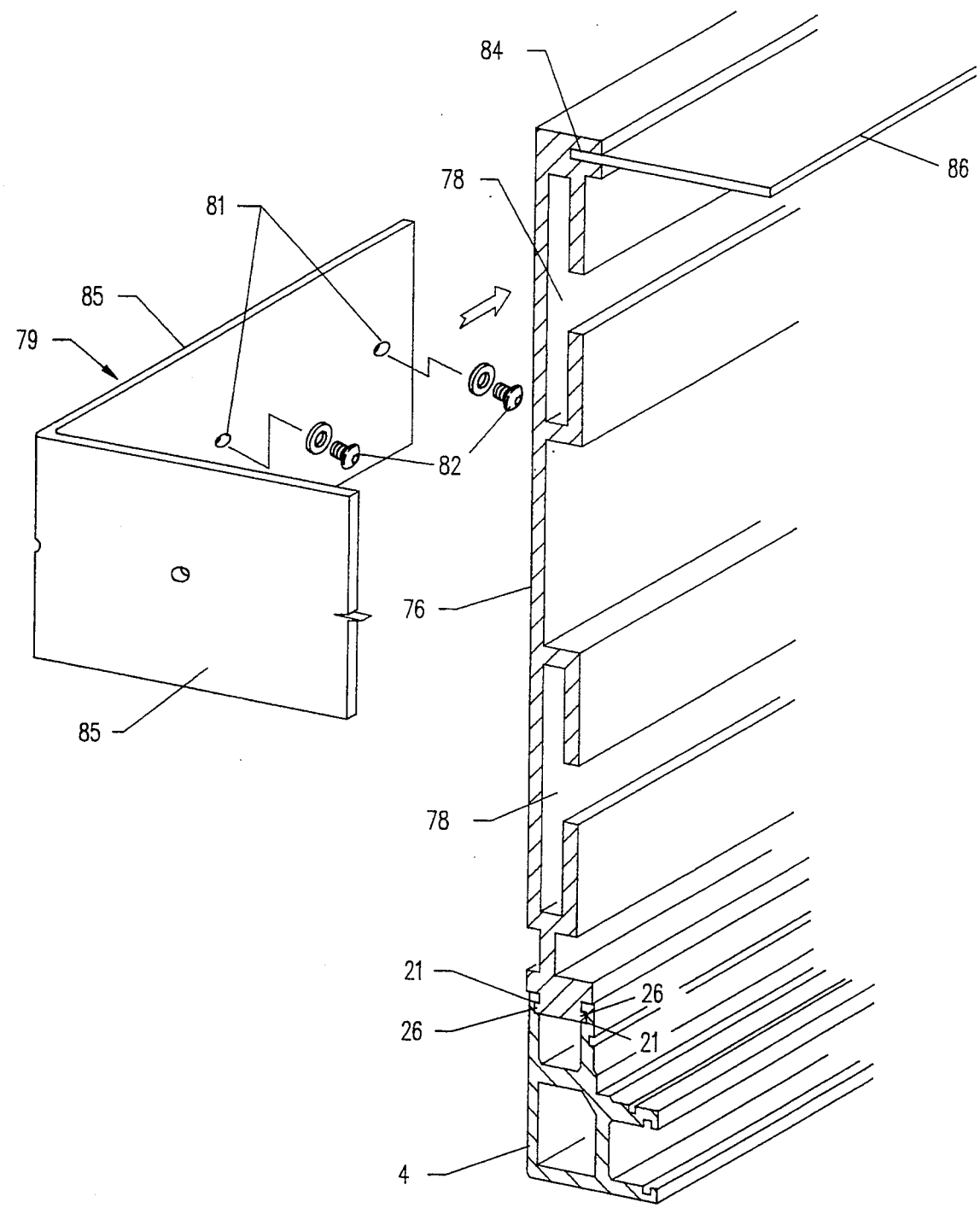
FIG. 27 is a cross-sectional detail view of the invention showing details of a transparency box.

FIG. 13a, b and c show extrusions that have open "snap-in" channels 29, that are arranged to have two outward facing strips 31 that serve to lock into grooves 23 of the right angle open channel 22, seen in FIG. 10, as shown in FIG. 13c, wherein the two strips 31 can snap into the grooves 23. To facilitate the insertion, the strips 31 have a triangular cross-section, like hooks that grab the edges of the groove 23. The open snap-in channel 29 can be combined with another open channel 31a, in FIG. 13b, that serves to contain light fixtures 32, e.g. fluorescent tubes or the like, that are arranged along the edges of a show case, as seen in FIG. 27. Another use of the snap-in channel is seen in FIG. 14c, wherein the snap-in channel 29 serves to contain and conceal electric wiring and the like.

Figure 14B:
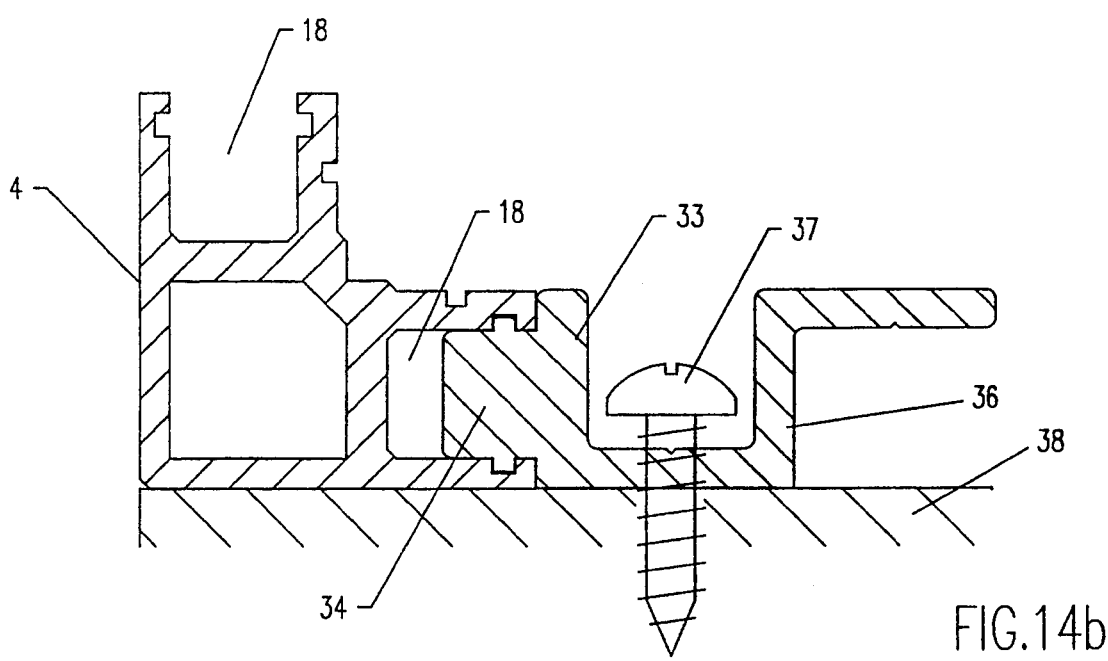
FIG. 14d is a cross-section of an electric conduit extrusion.
Figure 14C:
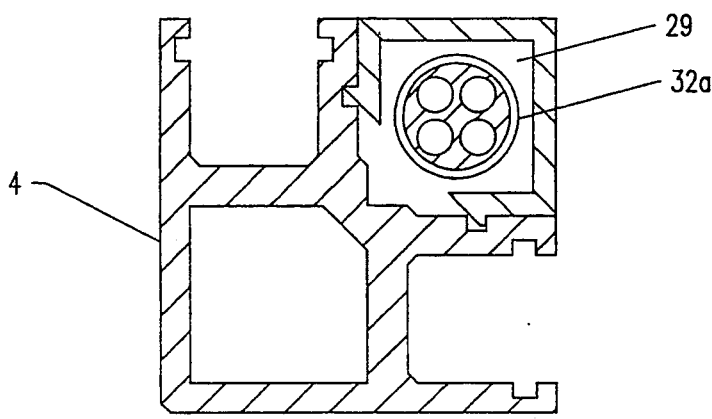
Figure 14D:
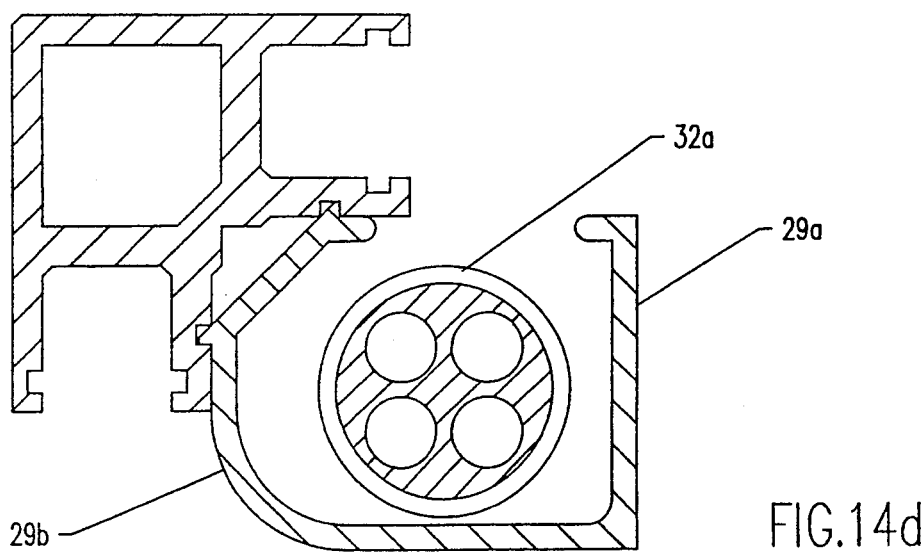

FIG. 14d shows another snap-in channel 29a with a curved wall section 29b especially suited for holding flexible electrical conduits 32a so that they are concealed and do not detract from the appearance of the display.

Figure 19:
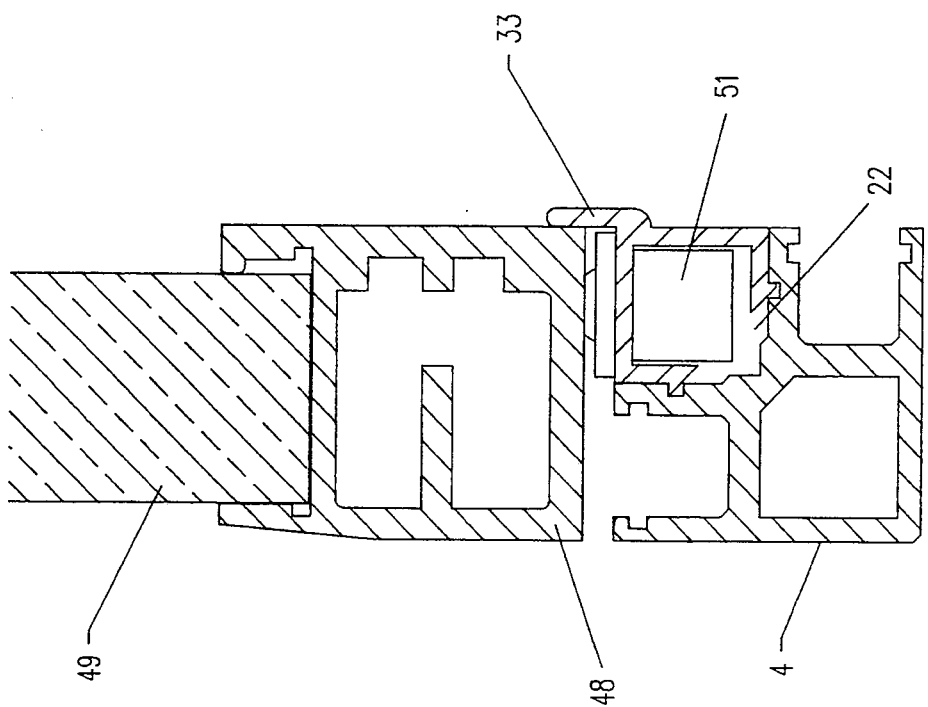
FIG. 19 is another cross-section detail showing an edge extrusion of a door closing against a corner extrusion with a bullet catch.
Figure 18:
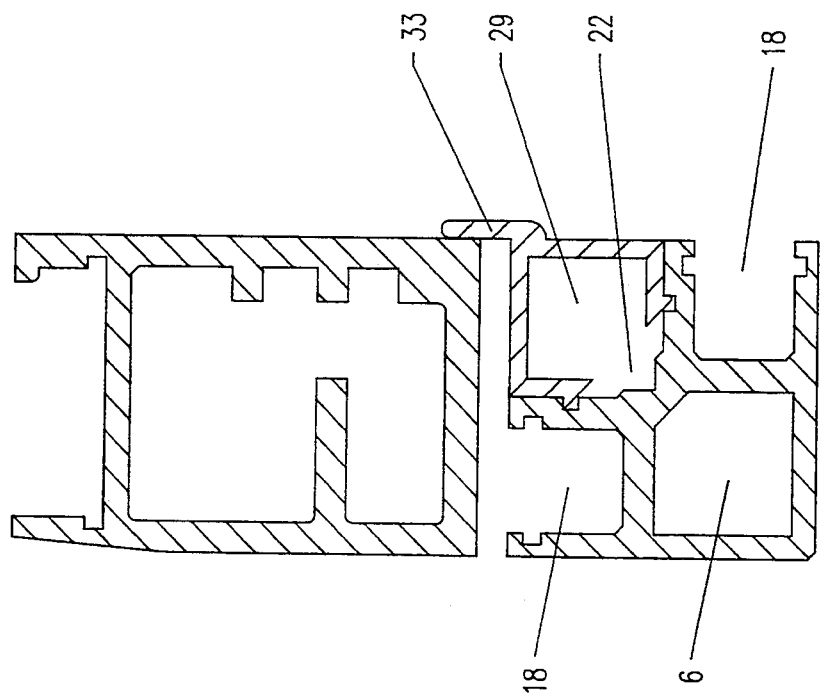
FIG. 18 is a cross-sectional detail view of the invention showing a door stop extrusion and a ball stop.

FIG. 13a shows still another type of the snap-in channel which has a longitudinal flange 33, that can serve e.g. as a door stop as seen in FIGS. 18 and 19.

FIG. 14b shows still another extrusion that cooperates with the open channel 18, namely the mounting channel 33, which has a prismatic body part 34, similar to a half part of the universal connector 24 that locks into the open channel 18, and has a mounting flange 36 for receiving a mounting screw or bolt 37 serving to secure the extrusion 4 to a wall 38, which is very useful when flush mounting of a show case against a wall is desired.

Figure 15:
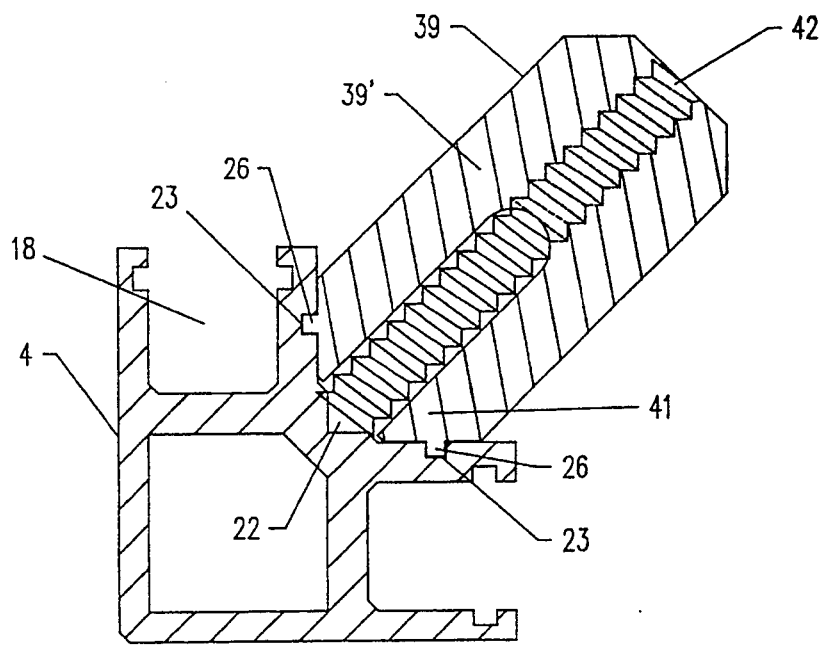
FIG. 15 is a cross-sectional detail view of the invention showing a shelf support.

FIG. 15 shows a shelf support element 39 having a prismatic body 39' seen from an end. The shelf support 39 has one ninety degree edge 41 that fits into the right angle open channel 22 of extrusion 4, and has two longitudinal strips 26, as also seen on the universal connector 24, but positioned so that they fit in the grooves 23 of the right angle channel 22. A threaded hole 42 is drilled through the body 39' of the shelf support 39 to receive a set screw, the tip of which can be tightened against the inner corner of the right angle channel 22 and firmly lock the shelf support 39 in the channel for supporting corners of shelves in the display.

Figure 16:
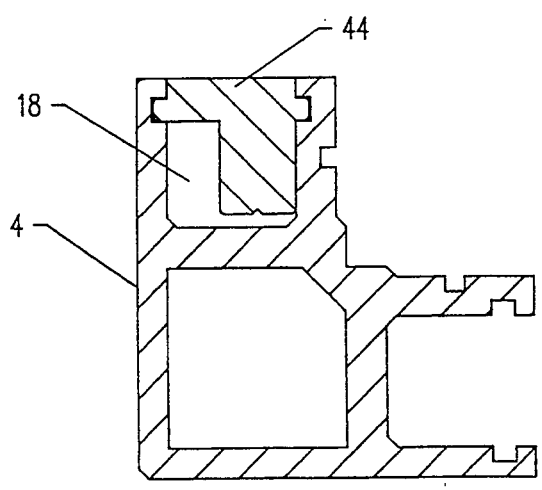
FIG. 16 is a cross-sectional detail view of the invention showing a decorative insert extrusion.
Figure 17A:
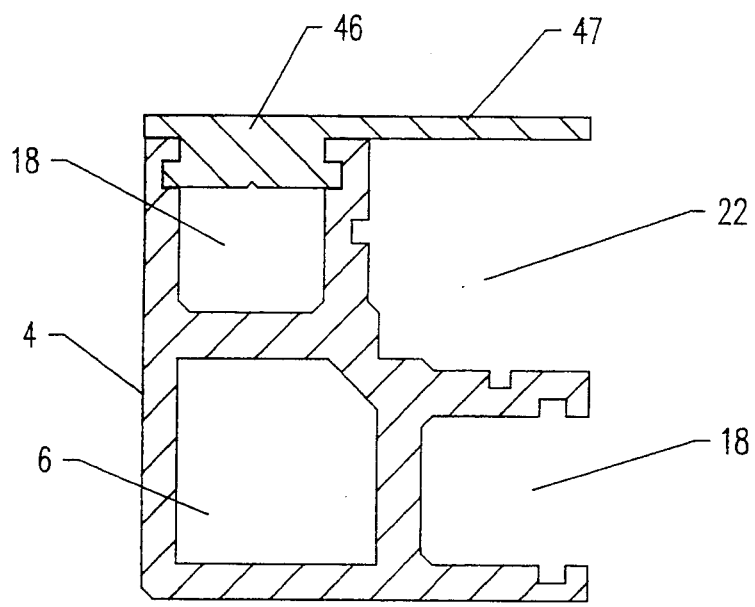
FIG. 17a and b are cross-sectional detail views of the invention showing a decorative extrusion.
Figure 17B:
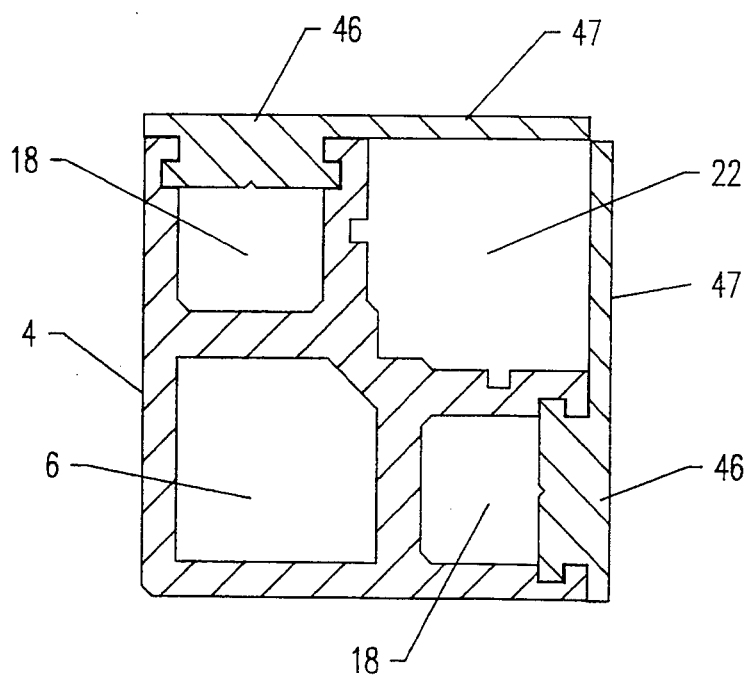

FIG. 16 shows an extrusion of the type 4 described above with a decorative insert extrusion 44 which slidably fits into the right angle open channel 18 of extrusion 4, described above. The decorative insert 44 closes an opening that might otherwise be considered to be unsightly, FIG. 17a shows a decorative fillet extrusion 46 that slidably fits into the open channel 18 of extrusion 4 and has a flange 47 that serves to partly cover the right angle channel 22, and FIG. 17b shows two such decorative fillet extrusions 46 that completely enclose the channel 22 which can be used for concealing wiring or the like.

FIG. 19 shows an edge extrusion 48 of a door 49 closing against an extrusion 4 wherein the right angle open channel 22 is closed with the snap-in extrusion of FIG. 13a, and a spring-loaded bullet door catch 51 built into the right angle channel 22.

Figure 20A:
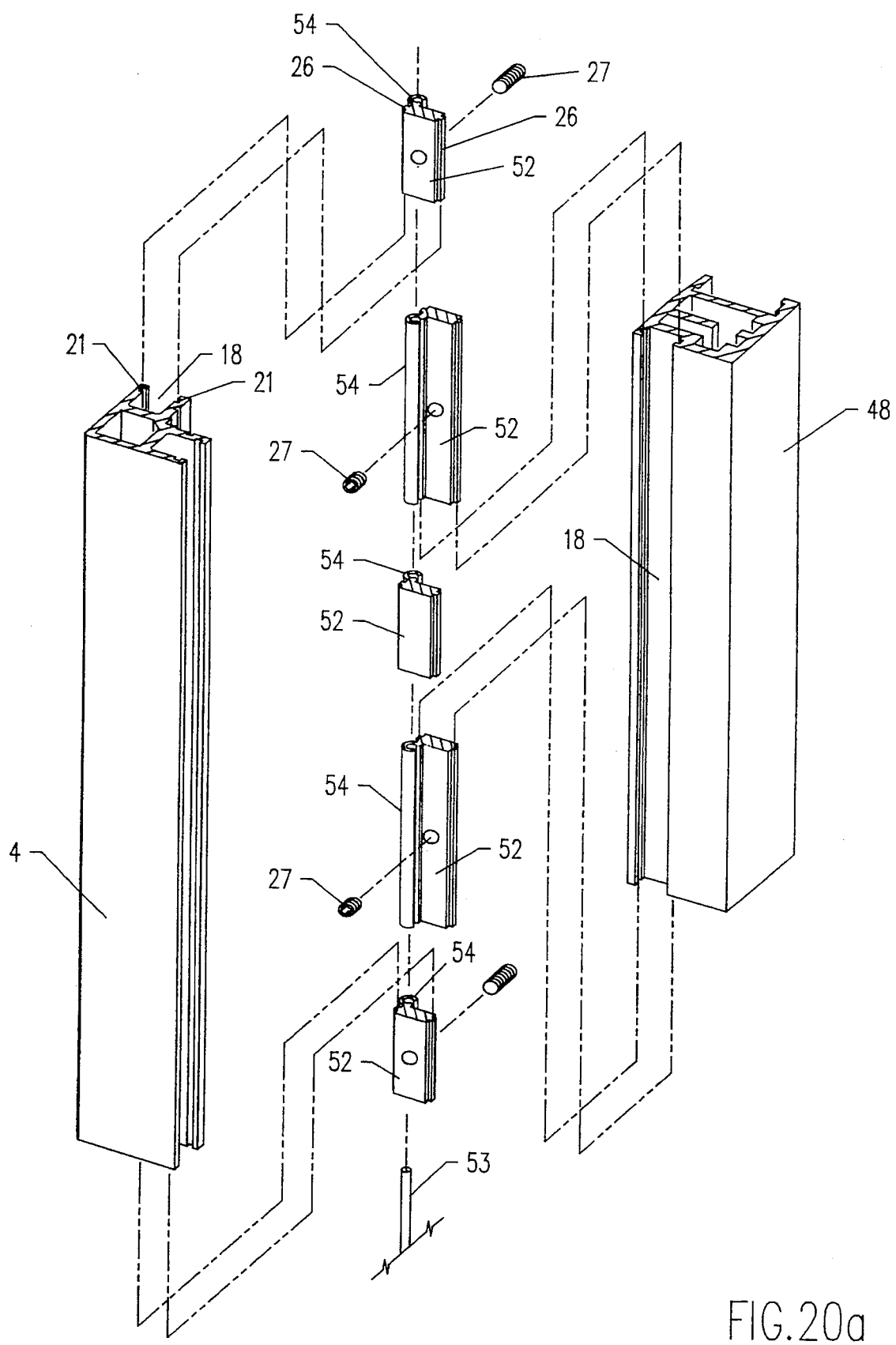
FIG. 20a and b are detail perspective views of the invention showing details of a door and door hinge.

FIG. 20a shows a number of the elements described above used in constructing a hinged door. The extrusion 4, described above has a number of fixed hinge parts 52 inserted into the open channel 18 with strips 26 fitting into the grooves 21 as the universal connector 24, seen in FIGS. 11 and 12, and having a similar set screw 27 to lock it in place in the channel 18. The door edge extrusion 48 has a channel 18 similar to channel 18 in extrusion 4, which receives a similar hinge part 52, but turned around 180' so that opposing hinge pin channels 54 become coextensive to receive a common hinge pin 53.

Figure 20C:
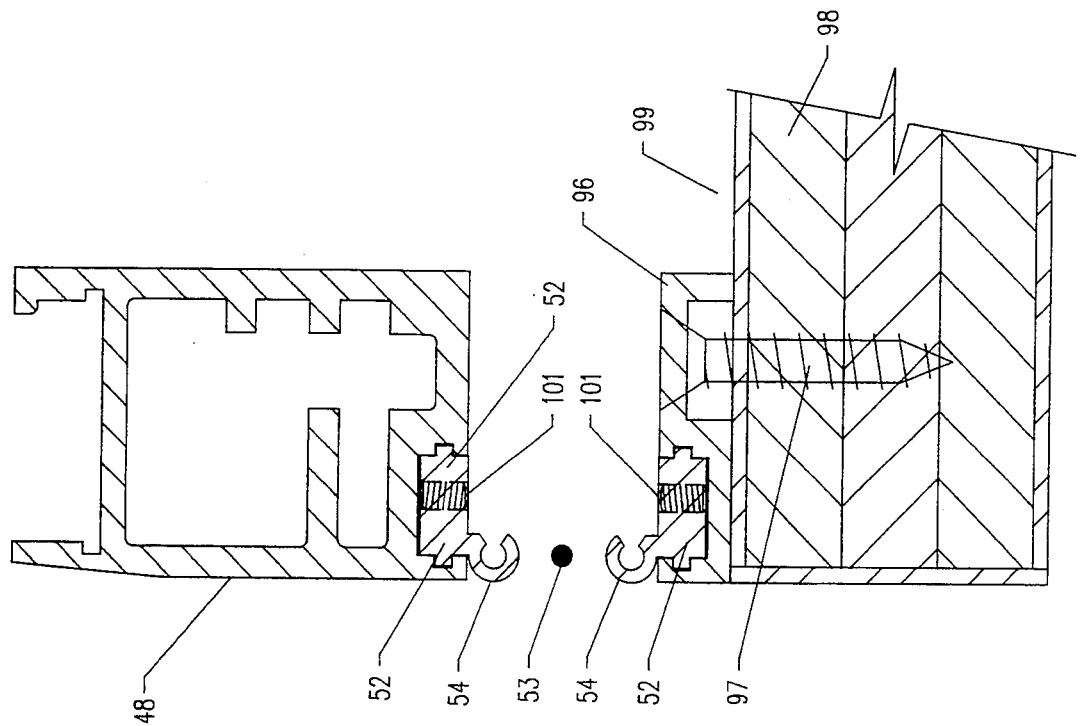
FIG. 20c is a cross-section of a door edge with extruded hinge parts and a hinge pin.
Figure 20B:
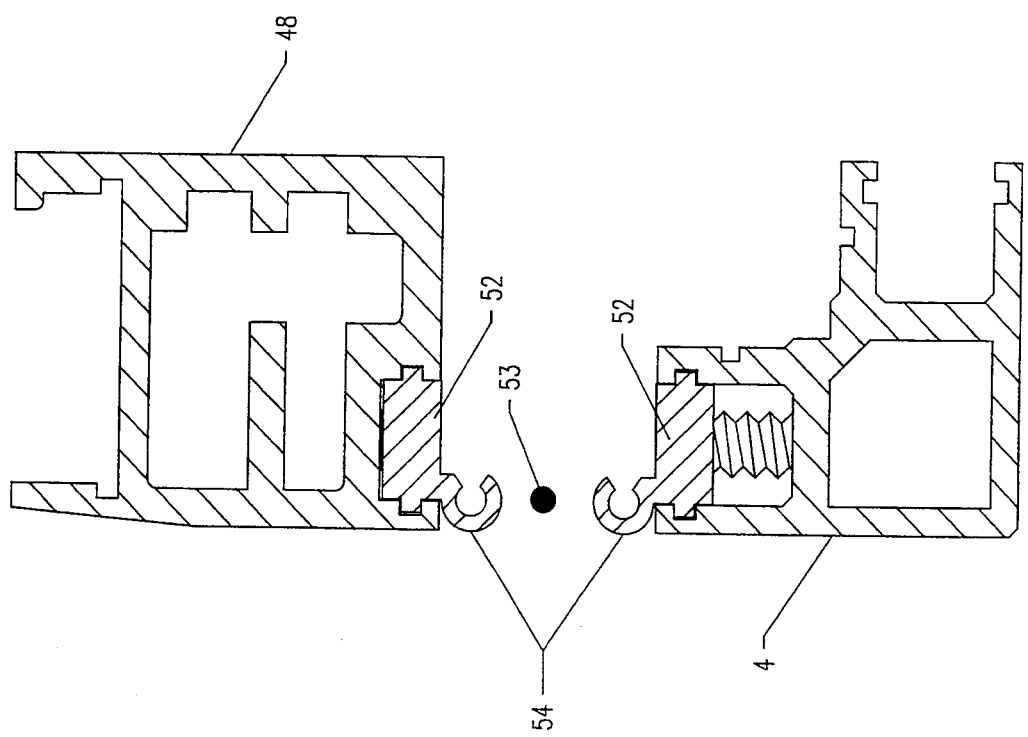
FIG. 20d is a cross-section of a panel door with a cam lock.
FIG. 20e is a cross-section of a heavy glass door with a cam lock.
FIG. 20f is a cross-section of a light glass door with a cam lock.
FIG. 20g is a cross-section of a flap door with a cam lock.
FIG. 20h is a perspective view of the flap door according to FIG. 20g, showing details of the hinge parts.
FIGS. 20i through 20m show cross-sections of a door with concealed hinges and light-tight door cracks.

FIG. 20b shows the hinge construction in more detail, including the hinge pin 53.

FIG. 20c shows hinge details applied to a large flap door 99 in standard wood construction, which includes a fixed extruded hinge part 96 attached by a wood screw 97 to the wood structure 98. The hinge parts 52 are similar to the hinge parts 522 shown in FIG. 20b and are each secured in a matching groove in the door edge extrusion 48 and the extended hinge part 96 by means of Allen set screws 101 (shown in phantom lines) in their respective grooves.

Figure 20D:
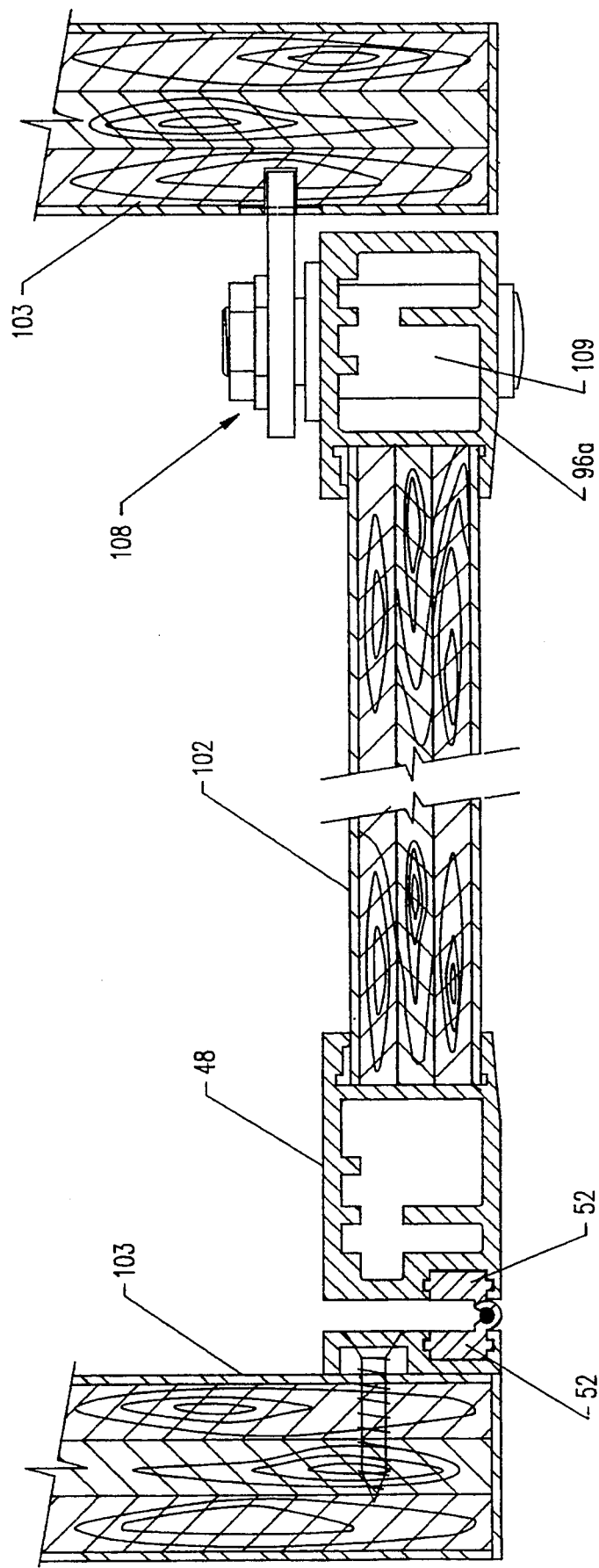
Figure 20E:
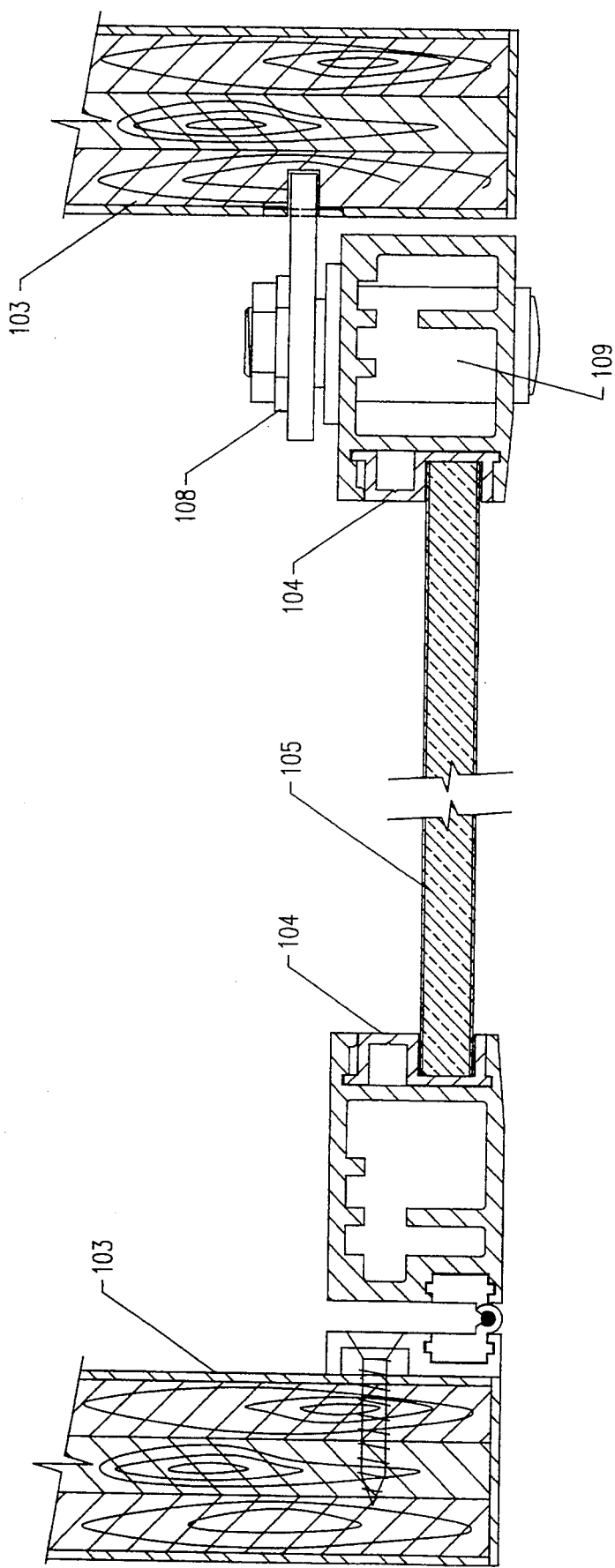
Figure 20F:
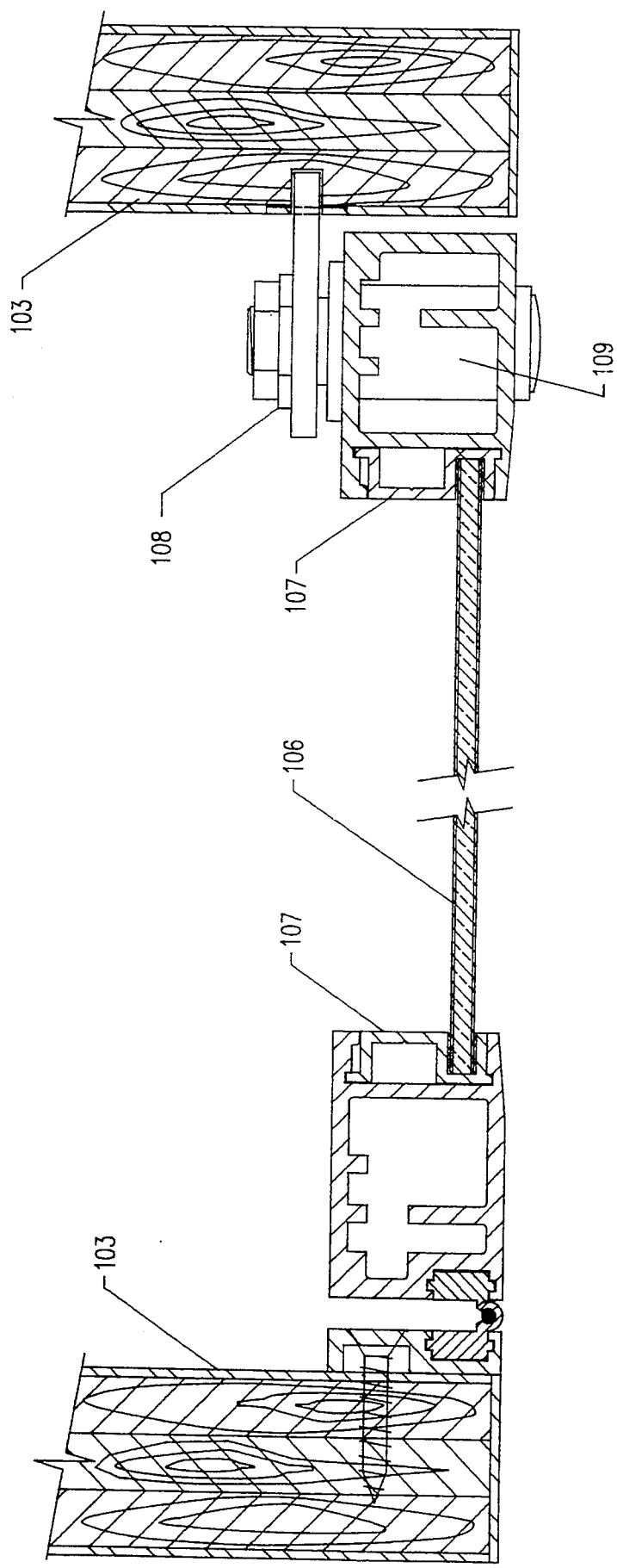

Other door construction details are shown in FIGS. 20d, 20e and 20f, wherein FIG. 20d shows a panel door with ½" door panel 102 made e.g. of wood or particle board or the like, enclosed in door edge extrusions 48, 96a as described above. The door 102 is inserted between side panels 103 of wood or particle board or the like.

The door structure shown in FIG. 20e has a front panel 105 of ¼" glass, secured by extruded filler strips 104, that make up the difference in the thickness of the door panel 105.

FIG. 20f shows a similar door with only a ⅛" glass panel 106 and a correspondingly wider filler strip 107.

Each door can be equipped with a cam lock 108 of conventional construction with a lock cylinder 109 for a conventional key, not shown.

Figure 20G:
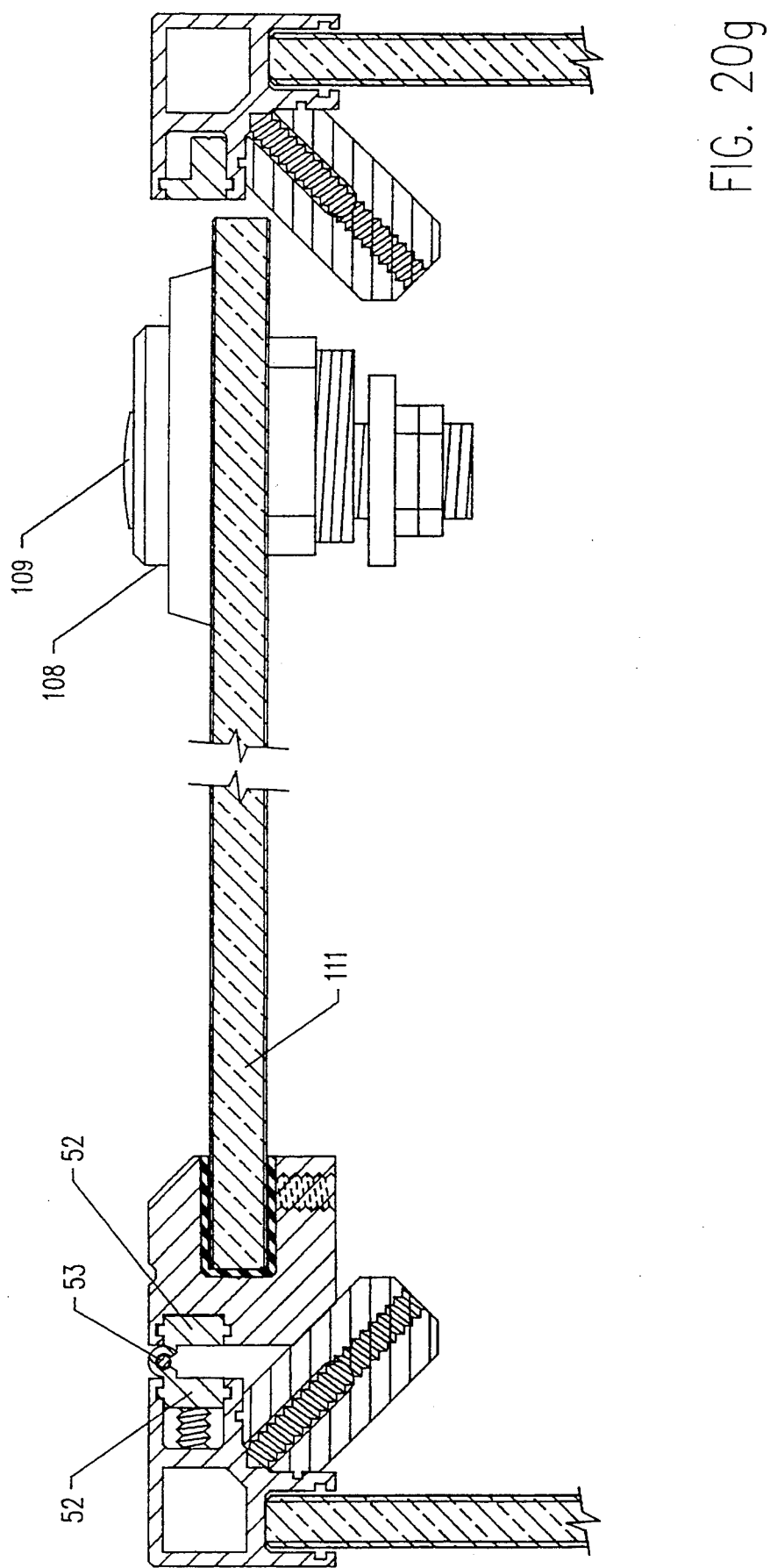

FIGS. 20g and h show details of a flap door 111, 112 also equipped with a cam lock as described above, but wherein the door panel proper is formed of a single glass panel without a supporting frame.

In some display cases, it is often desirable to avoid light shining through cracks of the door, especially if the door panel is a lightly tinted transparent panel. FIGS. 20i–20m show details of such a door construction, which has the further advantage that the door hinge is invisible when the door is in closed condition as viewed from the outside.

In this arrangement the door panel 113 is shown completely open in FIG. 20i so that the contents of the display can be viewed in direction of arrow A, and completely closed in FIG. 20L. The door panel 113 may be composed of one or two sheets 114, 116 that are inserted in a door frame extrusion 117 having a groove for holding the door panels(s) 113. The door frame extrusion is hingedly attached by a hinge pin 53 to hinge parts 52 as described above under FIGS. 20a, 20b.

Since the hinge pin 53 with hinge parts 52 are set back a distance "a" (FIG. 20K) from the rear surface 119 of the door panel 113 and a distance "b" from the door edge 121, it follows that in the closed condition of the door, the door crack is completely closed as shown in FIG. 20L. The door crack to the opposite door side, seen in FIG. 20m, is also in the closed condition, and is completely closed against escaping light by an inward-facing lip 122, which is part of the frame extrusion 117.

Figure 21:
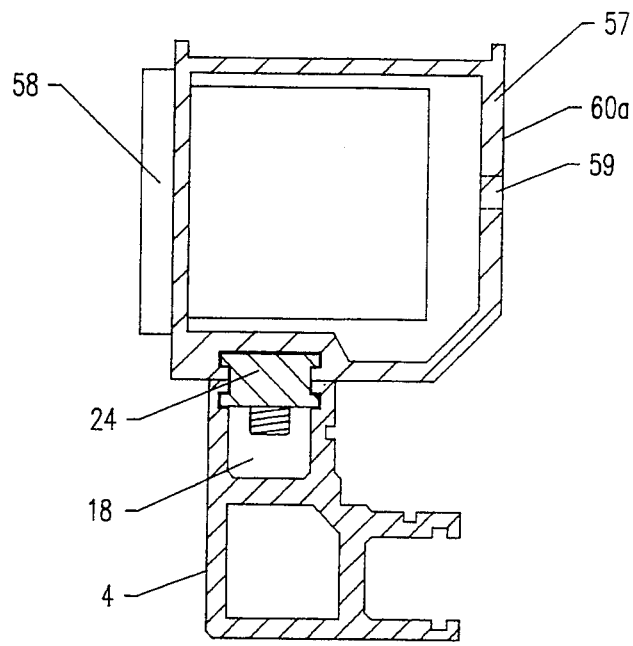
Figure 21A:
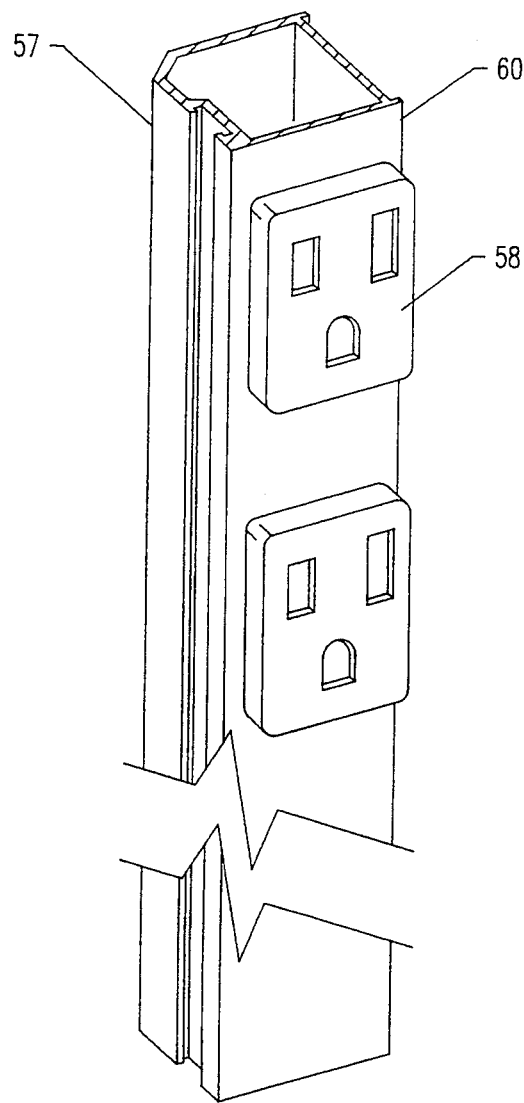
FIG. 21a is a perspective view of a slide door side track with snap-in convenience outlets.
Figure 21B:
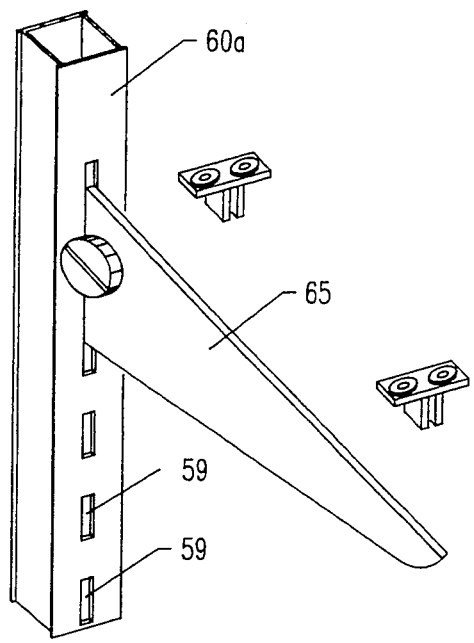
FIG. 21b is a perspective view of an upright extrusion with mountings for shelf brackets.

FIGS. 21, 21a and 21b show an end column extrusion 57 that can be attached to an open channel 18 of the extrusion 4, by means of the universal connectors 24 as described above. The end column extrusion 57 can have electric outlets 58 on e.g. one side 60 and slots 59 for shelf brackets 65 on the other side 60a.

Figure 22:
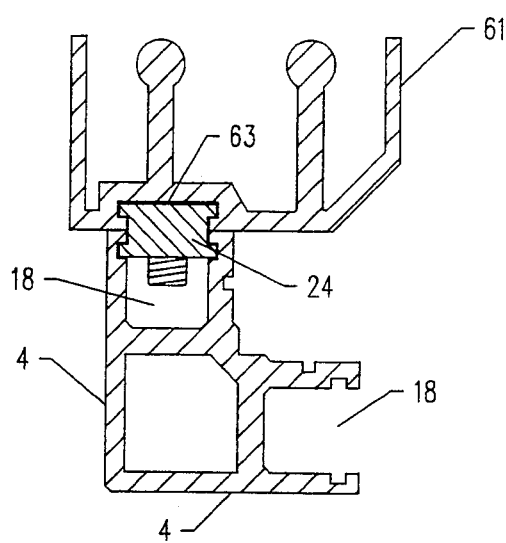
FIG. 22 is a cross-sectional detail view of the invention showing a bottom track for a sliding door.
Figure 23:
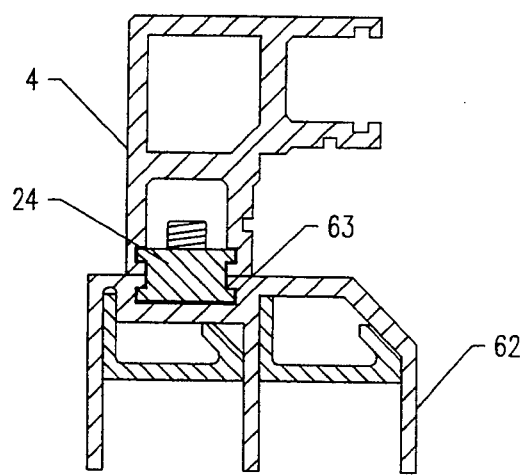
FIG. 23 is a cross-sectional detail view of the invention showing a top track for a sliding door.

FIGS. 22 and 23 show a respective bottom track 61 and top track 62 for sliding doors. Both tracks have open channels 63 that can accept one half of the universal connector 24 in order to connect the tracks 61, 62 with the open channel 18 in the extrusion 4, as described above.

Figures 24, 25:
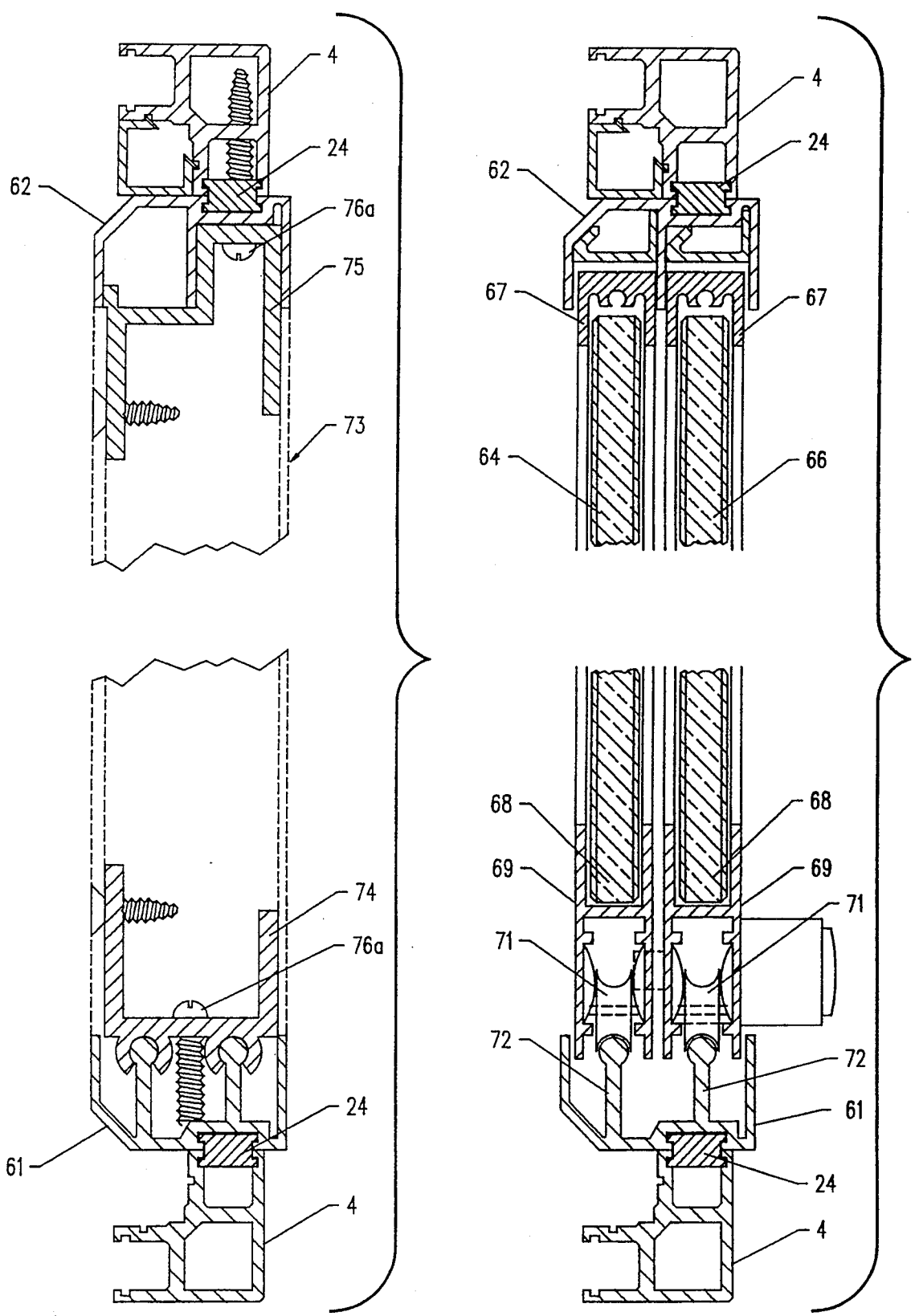
FIG. 24 is a cross-sectional detail view of the invention showing construct ion of a partition column.
FIG. 25 is a cross-sectional detail view of the invention showing details of a sliding door.

FIG. 24 shows a partition or column 73, installed in a fixed position on the top and bottom tracks 61, 62 used for sliding doors as described above, but now using two partition extrusions 74, 75 locked into place by screws 76a.

FIG. 25 shows details of a sliding door assembly, with the top and bottom tracks 62, 61 respectively holding two sliding doors 64, 66. The top edges 67 of the doors fit into the top track 62. The bottom edges 68 fit into two roller assembly extrusions 69 with rollers 71 rolling on two rails 72 in the bottom track 61.

Figure 26:
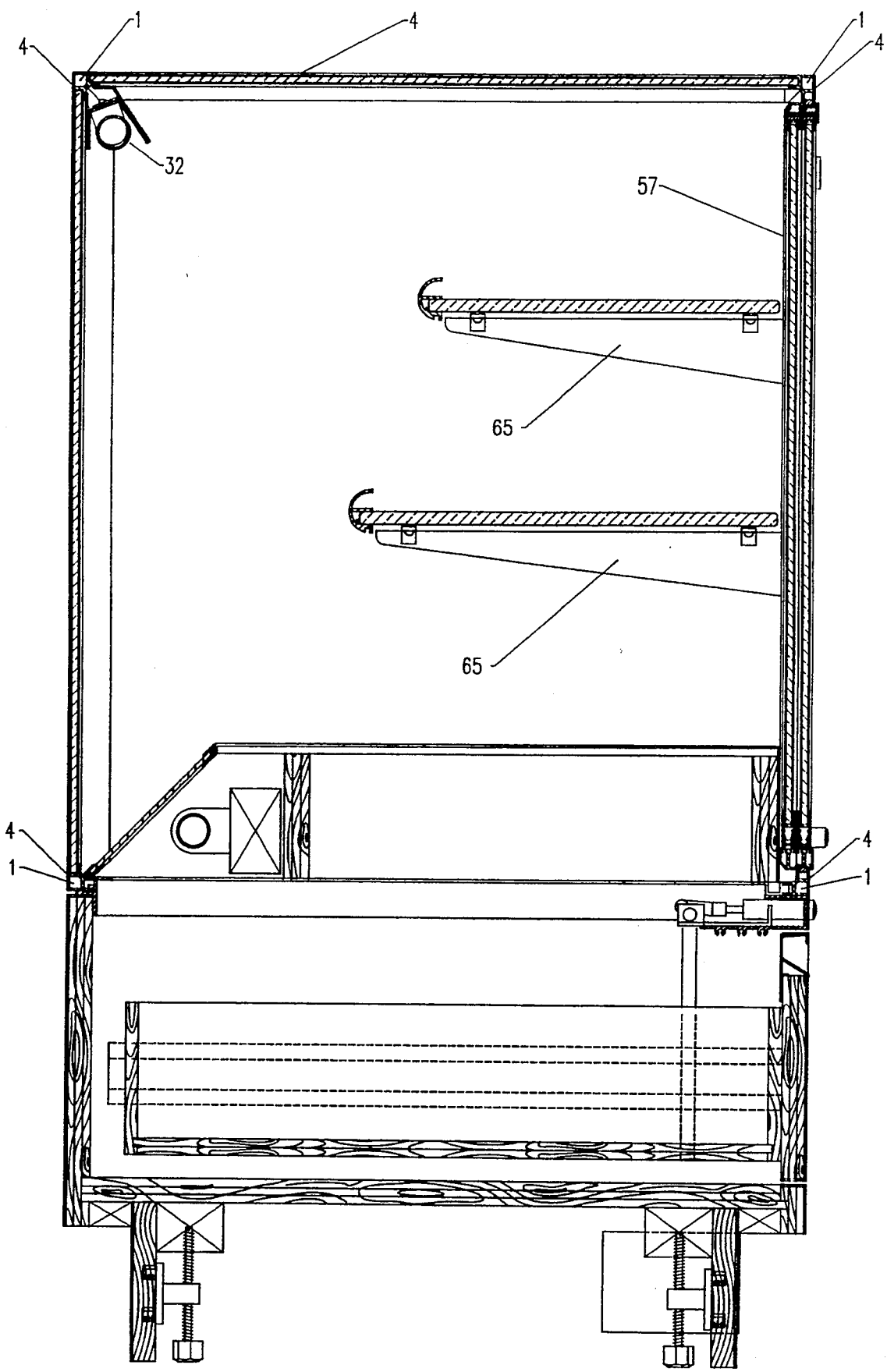
FIG. 26 is an elevational diagrammatic cross-sectional view of the invention with part of the wall broken away to show the interior construction of a show case.

FIG. 26 shows an example of an assembled display as described above. The edges of the display are formed by the extrusions type 4 joined at the corners by the angle connectors 1. The light fixtures 32 are contained in the double-open channel extrusions according to FIG. 13b. Shelf brackets 65 are supported in column extrusions 57 as shown in FIGS. 21b and 26.

Figure 9:
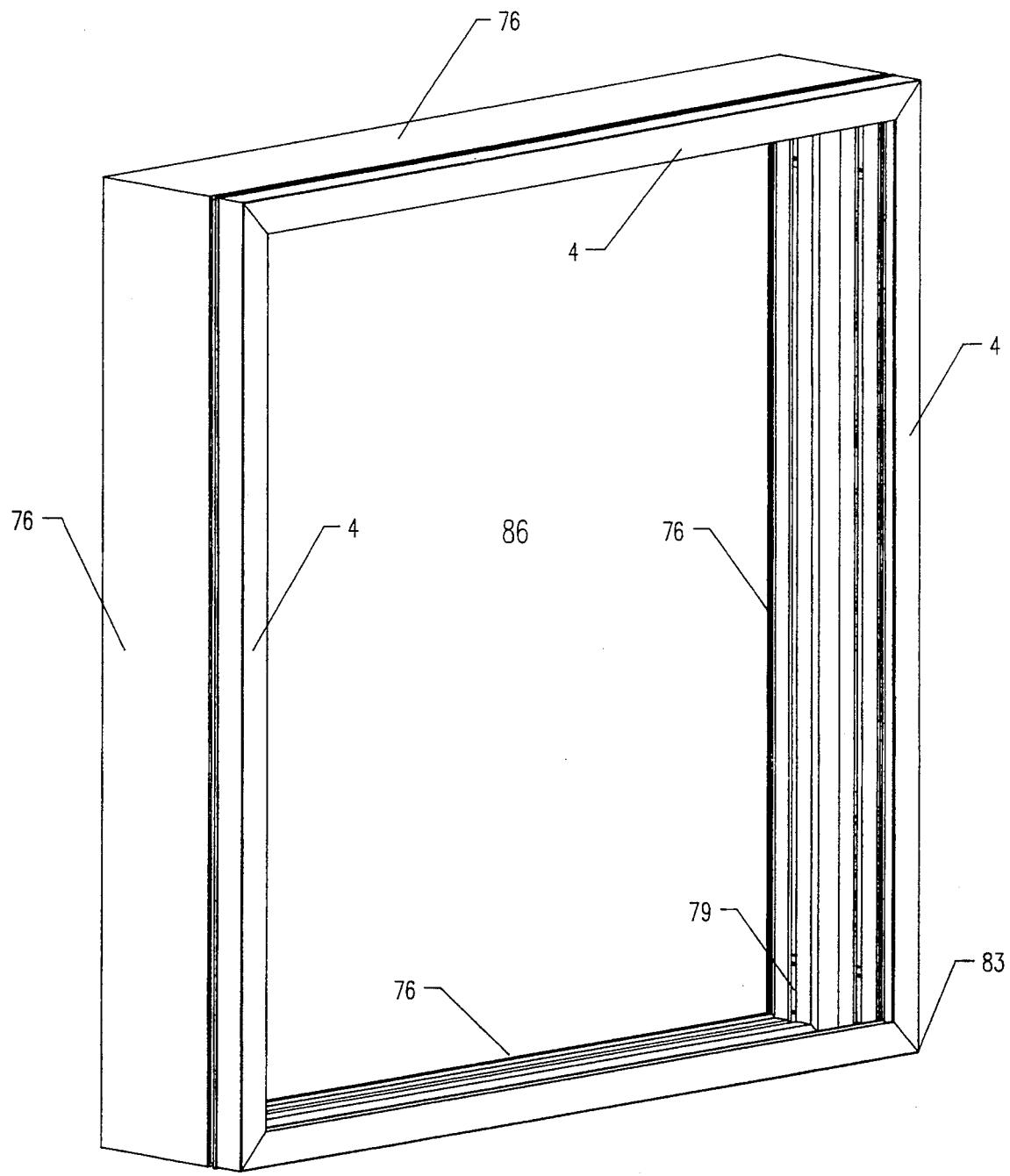
FIG. 9 is an isometric representation of a transparency box.

A special form of a display is the transparency box 77 which is a wall-mounted display seen in isometric representation in FIG. 9. The transparency box 77 includes a sturdy frame formed of frame extrusions 76 having a profile as shown in FIG. 27, wherein open channels 78 serve to receive corner connectors 79 with two legs 85 at 90° angle shown diagrammatically in FIG. 27. The corner connectors 79 have holes 81 for receiving Allen button screws 82 e.g. 8-32×¼" with washer as described above for locking the frame extrusions 76 together at the corners 83. Extrusions of the type 4 are used as front edge extrusions joined by grooves 21 and strips 26 as seen in FIG. 27, and described above in the description of FIG. 10. Another groove 84 can be provided to receive a sheet back panel 86. Front doors, shelves, light fixtures and the like can be added by means of various interlocking cooperating extrusions as described hereinabove.

Figure 28:
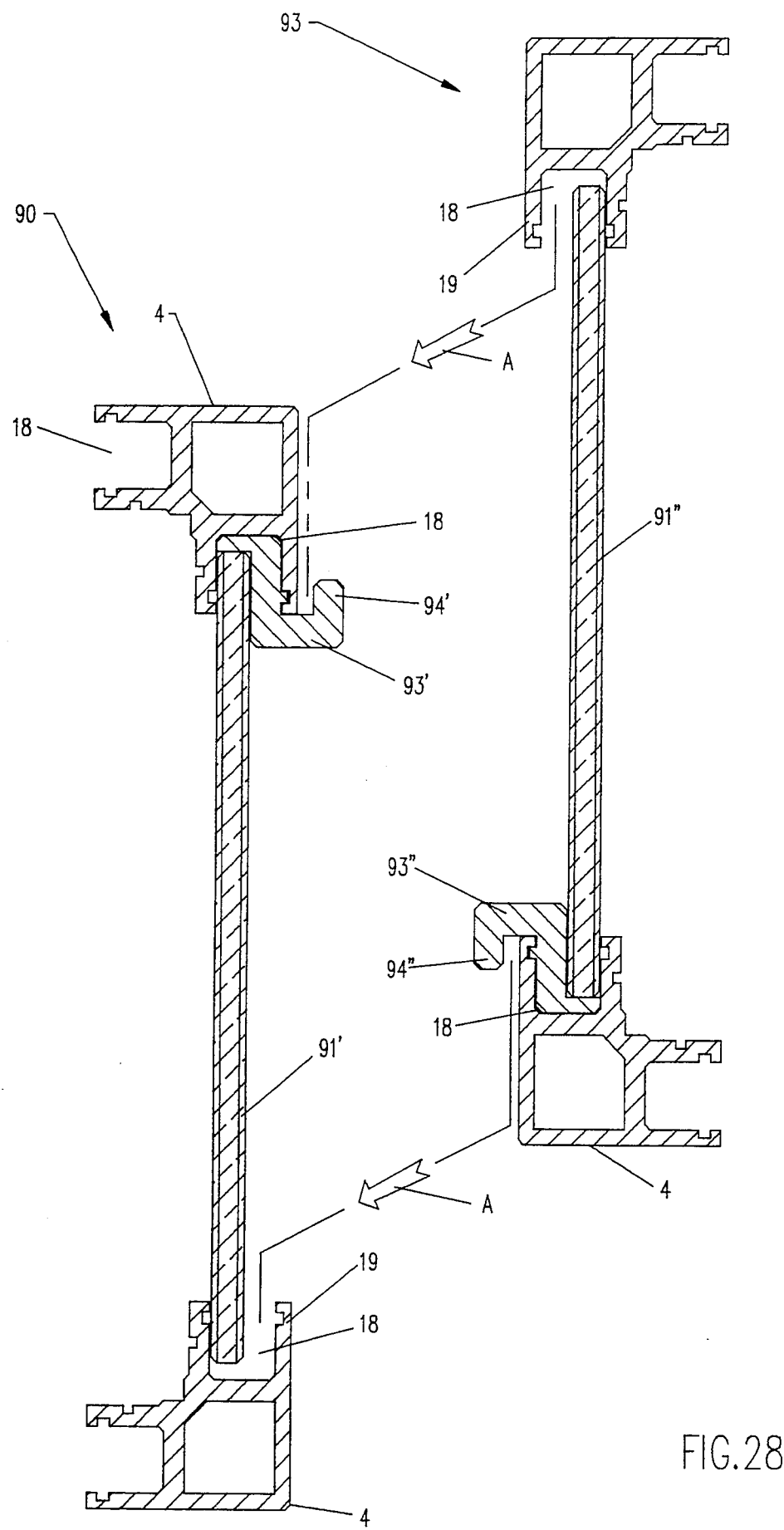
FIG. 28 is a cross-sectional view of a display case joining system that provides automatic door leveling.

FIG. 28 shows an especially advantageous method of joining adjacent displays, which is "self-leveling" in that it overcomes the problems that stem from unevenness of the floor. In FIG. 28 item 91' is a vertical side wall of an already installed display 90. An additional display 93 is to be installed adjoining display 90. In this case glass partitions 91', 91" are installed in the open channels 18 of the corner extrusions 4 as described above, but leaving a free space in the channel, which allows room for installing S-shaped hanging extrusions 93' and 93", having respective upward and downward facing lips 94', 94" that are inserted behind respective side walls 19 of the extrusions 4 as indicated by arrows A. In that case, after the two portions are joined, the top surface of the added display will be exactly level with the already installed display, and adjustable floor levelers of the added cabinet can be lowered so that it is firmly supported at the floor, even it some floor unevenness is present.

I claim:

1. A modular system of mutually cooperating building elements comprising an angle connector having at least two elongated arms, each arm having an external cross-sectional profile and a long dimension, said arms having a common junction, each arm having at least one recess with an inward facing edge facing said junction wherein said edge is disposed transversely to the long dimension of said arm; at least one set screw having a conical end surface; at least one extrusion having a closed channel for receiving one of said arms; and at least one threaded hole in said channel for receiving said set screw, said threaded hole aligned with said inward facing edge so that said conical end surface of said set screw offsetly engages said inward facing edge for urging said extrusion in direction to said junction.

2. Modular system according to claim 1, wherein said extrusions have mitre-cut inward facing ends for matching each other at said junction.

3. Modular system according to claim 1, wherein said extrusion has at least one open channel facing away from said closed channel for receiving other ones of the building elements.

4. Modular system according to claim 3, wherein said open channel includes a pair of parallel longitudinal walls, each having at least one groove therein for receiving another building element, said other building element having longitudinal strips receivable in said grooves.

5. Modular system according to claim 4, including a universal connector having a prismatic shape, and at least two pairs of said longitudinal strips slidably receivable in matching grooves in mutually facing open channels of adjacent parallel building elements for joining said parallel building elements.

6. Modular system according to claim 4 including an extrusion having a single open channel having two outward facing strips receivable in respective grooves of said pair of parallel longitudinal walls of an adjoining element.

7. Modular building system according to claim 6, including at least one further open channel connected with and parallel with said single open channel for receiving at least one utility element.

8. Modular building system according to claim 7, wherein said utility element is a light fixture.

9. Modular building system according to claim 3, wherein the open channel has one pair of parallel longitudinal walls, each wall having a longitudinal groove facing the other wall of said pair of longitudinal walls for slidably receiving another one of the building elements having longitudinal strips each matching a respective longitudinal groove in each longitudinal wall.

10. Modular system according to claim 3, including a building element having a plurality of open channels each having a pair of parallel longitudinal walls, each wall having a longitudinal groove facing the other wall of said pair of walls for receiving another one of the building elements, said other building element having longitudinal strips matching a respective longitudinal groove in each longitudinal wall.

11. Modular system according to claim 3, wherein said extrusion includes at least one open channel having a pair of parallel longitudinal walls, each wall having a longitudinal groove facing the other wall for receiving another one of the building elements, said other building element having longitudinal strips each matching a respective longitudinal groove in each longitudinal wall.

12. Modular system according to claim 9 wherein one of said channels includes two parallel right angle longitudinal walls disposed at a 90° angle with each other, forming a right angle channel, each wall having a longitudinal groove in adjoining sides of said right angle walls, and a shelf support having a prismatic body with a right angle edge matching said right angle channel, said right angle edge having longitudinal strips receivable in said longitudinal grooves in said right angle channel, a threaded mounting hole perpendicular to said right angle edge through said prismatic body, and a mounting screw receivable in said mounting hole for securing said shelf support to said 90° channel.

13. Modular system according to claim 3, including a decorative insert strip receivable in said open channel.

14. Modular system according to claim 11, wherein said insert strip has a longitudinal side flange extending away from said insert strip.

15. Modular system according to claim 6, wherein said extrusion having an open channel includes a longitudinal door stop flange, and a spring-loaded ball door stop disposed in said open channel.

16. Modular system according to claim 5, including a longitudinal door hinge extension on said prismatic body of the universal connector, said door hinge extension having a longitudinal recess for receiving a hinge pin.

17. Modular system according to claim 4, including a T-connector slidably receivable in said open channel extending perpendicularly thereto, said T-connector having an elongate prismatic body, two transverse strips at one end of said prismatic body, each transverse strip matching a respective groove in said longitudinal walls; a threaded longitudinal hole in said prismatic body; a mounting screw receivable in said threaded hole for mounting said prismatic body perpendicularly in said open channel; said prismatic body having at least one recess with an inward facing edge facing said open channel, a further extrusion having a closed channel for receiving said prismatic body; a set screw with a conical end; at least one further threaded hole in said further extrusion for receiving said set screw, said further threaded hole aligned with said inward facing edge so that said conical surface of said set screw offsetly engages said inward facing edge for urging said further extrusion in direction to said open channel.

18. Modular system according to claim 5, wherein said parallel building elements include at least one sliding door bottom track, and at least one sliding door top track for receiving at least one sliding door; a roller assembly attached to a bottom edge of said door; and at least one rail in said sliding door bottom track for slidably supporting said roller assembly.

19. Modular system according to claim 16 including at last one of the universal connectors for attaching said top track to a top extrusion, and at least one other of the universal connectors for attaching said bottom track to a bottom extrusion.

20. Modular system according to claim 17 including an extruded partition column disposed between said top and bottom extrusion, and one of the universal connectors for attaching each end of said column extrusion to a respective top and bottom extrusion.

21. Modular system according to claim 1, including a plurality of corner connectors each with two legs, a plurality of frame extrusions each having at least one open channel for receiving a respective leg of said corner connectors, for forming a wall mounting transparency box.

22. Modular system according to claim 3, wherein said open channel includes a pair of parallel longitudinal walls, each having at least one groove therein for receiving another building element.

23. Modular building system according to claim 3, including at least one further open channel connected with and parallel with said single open channel for receiving at least one utility element.

24. Modular building system according to claim 3, wherein the open channel has one pair of parallel longitudinal walls, each wall having a longitudinal groove facing the other wall of said pair of longitudinal walls for slidably receiving another one of the building elements.

25. Modular system according to claim 3, including a building element having a plurality of open channels each having a pair of parallel longitudinal walls, each wall having a longitudinal groove facing the other wall of said pair of walls for receiving another one of the building elements.

26. Modular system according to claim 3, wherein said extrusion includes at least one open channel having a pair of parallel longitudinal walls, each wall having a longitudinal groove facing the other wall for receiving another one of the building elements.

* * * * *

UNITED STATES PATENT AND TRADEMARK OFFICE
CERTIFICATE OF CORRECTION

PATENT NO. : 5,345,737
DATED : September 13, 1994
INVENTOR(S) : Jim S. Latchinian It is certified that error appears in the above-indentified patent and that said Letters Patent is hereby corrected as shown below:

On the title page: Item [73] to read:

-- DISPLAY INTERNATIONAL CORPORATION, MIAMI LAKES, FL. --.

Signed and Sealed this

Thirty-first Day of January, 1995

Attest:

BRUCE LEHMAN

*Attesting Officer*  *Commissioner of Patents and Trademarks*